US008959573B2

(12) United States Patent
Smith et al.

(10) Patent No.: US 8,959,573 B2
(45) Date of Patent: Feb. 17, 2015

(54) NOISE, ENCRYPTION, AND DECOYS FOR COMMUNICATIONS IN A DYNAMIC COMPUTER NETWORK

(75) Inventors: Wayne B. Smith, Melbourne Beach, FL (US); Charles Powers, Melbourne, FL (US); Ellen K. Lin, West Melbourne, FL (US); Christopher T. Dowin, Melbourne, FL (US); Ryan E. Sharpe, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 152 days.

(21) Appl. No.: 13/461,057

(22) Filed: May 1, 2012

(65) Prior Publication Data
US 2013/0298181 A1 Nov. 7, 2013

(51) Int. Cl.
*G06F 17/00* (2006.01)
*H04L 29/06* (2006.01)

(52) U.S. Cl.
CPC .................................. *H04L 63/20* (2013.01)
USPC ............................................................. 726/1

(58) Field of Classification Search
CPC ............................. H04L 63/20; H04L 63/102
USPC ........................................ 726/1, 4; 713/189
See application file for complete search history.

(56) References Cited

U.S. PATENT DOCUMENTS

| 5,734,649 | A | 3/1998 | Carvey et al. |
| 6,052,064 | A * | 4/2000 | Budnik et al. ............... 340/7.24 |
| 6,646,989 | B1 | 11/2003 | Khotimsky et al. |
| 6,917,974 | B1 | 7/2005 | Stytz et al. |
| 6,981,146 | B1 | 12/2005 | Sheymov |
| 7,010,604 | B1 | 3/2006 | Munger et al. |
| 7,043,633 | B1 | 5/2006 | Fink et al. |
| 7,085,267 | B2 | 8/2006 | Carey et al. |
| 7,133,930 | B2 | 11/2006 | Munger et al. |
| 7,216,359 | B2 | 5/2007 | Katz et al. |
| 7,236,598 | B2 | 6/2007 | Sheymov et al. |
| 7,382,778 | B2 | 6/2008 | Chari et al. |
| 7,469,279 | B1 | 12/2008 | Stamler et al. |

(Continued)

FOREIGN PATENT DOCUMENTS

JP 2008177714 A 7/2008

OTHER PUBLICATIONS

U.S. Appl. No. 13/369,424, filed Feb. 9, 2012 Dynamic Computer Network With Variable Identity Parameters.

(Continued)

*Primary Examiner* — Anthony Brown
(74) *Attorney, Agent, or Firm* — Fox Rothschild, LLP; Robert J. Sacco

(57) ABSTRACT

A method and apparatus for processing data messages in a dynamic computer network is disclosed. The method includes implementing a mission plan specifying a message type, a message generation location, and a message distance vector for false messages, receiving a data message that includes a plurality of identity parameters, and determining a message type and a message distance vector for the received message. The network device is configured to generate false messages and process received messages. If the message type is a false message and the distance vector of the false message has been exhausted, the data message is dropped. If the distance vector of the false message has not been exhausted, transmitting the false message in accordance with the mission plan.

20 Claims, 13 Drawing Sheets

(56) References Cited

U.S. PATENT DOCUMENTS

| | | | |
|---|---|---|---|
| 7,712,130 | B2 | 5/2010 | Reamer |
| 7,739,497 | B1 | 6/2010 | Fink et al. |
| 7,756,140 | B2 | 7/2010 | Matoba |
| 7,757,272 | B1 | 7/2010 | Dean |
| 7,787,476 | B2 | 8/2010 | Shimizu et al. |
| 7,895,348 | B2 | 2/2011 | Twitchell, Jr. |
| 7,958,556 | B2 | 6/2011 | Roesch et al. |
| 7,996,894 | B1 | 8/2011 | Chen et al. |
| 8,139,504 | B2 | 3/2012 | Mankins et al. |
| 8,199,677 | B1 | 6/2012 | Amis et al. |
| 8,464,334 | B1 | 6/2013 | Singhal |
| 8,572,717 | B2 | 10/2013 | Narayanaswamy |
| 2002/0010799 | A1 | 1/2002 | Kubota et al. |
| 2002/0161884 | A1 | 10/2002 | Munger et al. |
| 2002/0161905 | A1 | 10/2002 | Haverinen et al. |
| 2003/0149783 | A1 | 8/2003 | McDaniel |
| 2004/0022194 | A1 | 2/2004 | Ricciulli |
| 2004/0103205 | A1 | 5/2004 | Larson et al. |
| 2004/0255167 | A1 | 12/2004 | Knight |
| 2005/0038708 | A1 | 2/2005 | Wu |
| 2005/0235044 | A1 | 10/2005 | Tazuma |
| 2006/0121418 | A1 | 6/2006 | DeMarco et al. |
| 2007/0058540 | A1 | 3/2007 | Kay |
| 2007/0073838 | A1 | 3/2007 | Shizuno |
| 2007/0081541 | A1 | 4/2007 | Umekage et al. |
| 2007/0261112 | A1* | 11/2007 | Todd et al. .................. 726/11 |
| 2008/0056487 | A1 | 3/2008 | Akyol et al. |
| 2008/0140847 | A1 | 6/2008 | Almog |
| 2008/0159128 | A1 | 7/2008 | Shaffer et al. |
| 2008/0172739 | A1 | 7/2008 | Nakae et al. |
| 2008/0205399 | A1 | 8/2008 | Delesalle et al. |
| 2008/0222734 | A1 | 9/2008 | Redlich et al. |
| 2008/0235755 | A1 | 9/2008 | Blaisdell et al. |
| 2008/0313348 | A1 | 12/2008 | Morris et al. |
| 2009/0031042 | A1 | 1/2009 | Phatak |
| 2009/0059788 | A1 | 3/2009 | Granovsky et al. |
| 2009/0106439 | A1 | 4/2009 | Twitchell, Jr. |
| 2009/0165116 | A1* | 6/2009 | Morris ....................... 726/14 |
| 2010/0009758 | A1 | 1/2010 | Twitchell, Jr. |
| 2010/0229241 | A1 | 9/2010 | Liu et al. |
| 2010/0246823 | A1 | 9/2010 | Xiao et al. |
| 2010/0274923 | A1 | 10/2010 | Dean |
| 2010/0322391 | A1 | 12/2010 | Michaelis et al. |
| 2010/0333188 | A1 | 12/2010 | Politowicz |
| 2011/0016210 | A1 | 1/2011 | Underwood |
| 2011/0179136 | A1 | 7/2011 | Twitchell, Jr. |
| 2011/0277032 | A1 | 11/2011 | Vargas |
| 2012/0117376 | A1 | 5/2012 | Fink et al. |
| 2012/0201138 | A1 | 8/2012 | Yu et al. |
| 2012/0303616 | A1 | 11/2012 | Abuelsaad et al. |
| 2013/0104228 | A1 | 4/2013 | Burnham et al. |

OTHER PUBLICATIONS

U.S. Appl. No. 13/369,433, filed Feb. 9, 2012 Mission Management for Dynamic Computer Networks.
U.S. Appl. No. 13/369,442, filed Feb. 9, 2012 Bridge for Communicating With a Dynamic Computer Network.
U.S. Appl. No. 13/461,158, filed May 1, 2012 Firewalls for Filtering Communications in a Dynamic Computer Network.
U.S. Appl. No. 13/461,139, filed May 1, 2012 Router for Communicating Data in a Dynamic Computer Network.
U.S. Appl. No. 13/461,112, filed May 1, 2012 Systems and Methods for Spontaneously Configuring a Computer Network.
U.S. Appl. No. 13/461,099, filed May 1, 2012 Systems and Methods for Implementing Moving Target Technology in Legacy Hardware.
U.S. Appl. No. 13/461,069, filed May 1, 2012 Systems and Methods for Identifying, Deterring and/or Delaying Attacks to a Network Using Shadow Networking Techniques.
U.S. Appl. No. 13/461,057, filed May 1, 2012 Noise, Encryption, and Decoys for Communications in a Dynamic Computer Network.
U.S. Appl. No. 13/461,024, filed May 1, 2012 Systems and Methods for Dynamically Changing Network States.
U.S. Appl. No. 13/461,022, filed May 1, 2012 Switch for Communicating Data in a Dynamic Computer Network.
U.S. Appl. No. 13/461,042, filed May 1, 2012 Systems and Methods for Dynamically Changing Network States.
U.S. Appl. No. 14/072,361, filed Nov. 5, 2013 Systems and Methods for Enterprise Mission Management of a Computer Network.
Michalski, John., et al., "Final Report for the Network Security Mechanisms Utilizing Network Address Translation LDRD Project (SAND2002-3613)" (Nov. 2002) Retrieved from the Internet: URL:http://prod.sandia.gov/techlib/access-control.cgi/2002/023613.pdf [retrieved on Apr. 19, 2013].
International Search Report mailed Apr. 29, 2013, Application Serial No. PCT/US2013/023702 in the name of Harris Corporation.
Atighetchi, M., et al, "Adaptive Use of Network-Centric Mechanism in Cyber-Defense", Proc. 6th IEEE International Symp. Object-Oriented Real-Time Distributed Computing, IEEE CS Press, 2003, p. 183-192.
Shi, L., et al., "Full Service Hopping for Proactive Cyber-Defense", International Conference on Networking, Sensing and Control, 2008. ICNSC 2008, IEEE, Apr. 6-8, 2008.
Kewley, D., et al., "Dynamic Approaches to Thwart Adversary Intelligence Gathering," pp. 176-185, 0/7695-1212-7/01 2001 IEEE.
Beraud, P., et al., "Cyber Defense Network Maneuver Commander", 978-1-4244-7402-8/10 2010 IEEE.
Levin, D., "Lessons Learned in Using Live Red Teams in IA Experiments", Retrieved from the Internet <URL:http://www.bbn.com/resources/pdf/RedTeamExptsPaper-Levin10-02.pdf>>, [retrieved on Apr. 9, 2012].
Zhao, C., Jia, C., & Lin, K. (Oct. 2010). Technique and Application of End-Hopping in Network Defense. In Crytopgraphy and Network Security, Data Mining and Knowledge Discovery, E-Commerce & Its Applications and Embedded Systems (CDEE), 2010 First ACIS International Symposium on (pp. 266-270). IEEE.
Search Report for Taiwan Patent Application No. 102115550 dated Oct. 20, 2014.
Repik, K.A. "Defeating Adversary Network Intelligence Efforts with Active Cyber Defense Techniques", Degree of Master of Cyber Warfare, Jun. 1, 2008, XP55004366, Retrieved from the Internet: URL:<http://www.dtic.mil/cgi-bin/GetTRDoc?A>D=ADA488411&Location=U2&doc=GeTRDoc.pdf [retrieved on Aug. 9, 2011].
International Search Report mailed Mar. 3, 2014, Application Serial No. PCT/SUS2013/038557 in the name of Harris Corporation.

* cited by examiner

| Identity Parameter | Description | Technique |
|---|---|---|
| IP Address | 32 bit number, Class C 254 Addresses | IP Header Manipulation Packet Data Manipulation |
| MAC Address | 6 Bytes - 281,474,976,710,656 Addresses First 3 Bytes - (OUI), Last 3 Bytes – NIC Specific | Ethernet Header Manipulation |
| Net/Subnet | Class A, B, or C Addresses | Cross Stream Fragmentation |
| TCP Sequence # | Make TCP Sequence numbers random. | TCP Header Manipulation |
| Port | 1 - 65,535 (ex. 2957) | TCP Header Manipulation |

FIG. 13

NOISE, ENCRYPTION, AND DECOYS FOR COMMUNICATIONS IN A DYNAMIC COMPUTER NETWORK

BACKGROUND OF THE INVENTION

1. Statement of the Technical Field

The inventive arrangements relate to computer network security, and more particularly to systems for generating noise, decoys, and encryption where the network is dynamically maneuverable to defend against malicious attacks.

2. Description of the Related Art

The central weakness of current cyber infrastructure is its static nature. Assets receive permanent or infrequently-changing identifications, allowing adversaries nearly unlimited time to probe networks, map and exploit vulnerabilities. Additionally, data traveling between these fixed entities can be captured and attributed. The current approach to cyber security places technologies such as firewalls and intrusion detection systems around fixed assets, and uses encryption to protect data en route. However, this traditional approach is fundamentally flawed because it provides a fixed target for attackers. In today's globally connected communications infrastructure, static networks are vulnerable networks.

The Defense Advanced Research Projects Agency (DARPA) Information Assurance (IA) Program has performed initial research in the area of dynamic network defense. A technique was developed under the Information Assurance Program to dynamically reassign Internet protocol (IP) address space feeding into a pre-designated network enclave for the purpose of confusing any would-be adversaries observing the network. This technique is called dynamic network address transformation (DYNAT). An overview of the DYNAT technology was presented in a published paper by DARPA entitled Dynamic Approaches to Thwart Adversary Intelligence (2001).

SUMMARY OF THE INVENTION

A method of processing data messages in a dynamic computer network is disclosed. The method includes implementing a mission plan specifying a message type, a message generation location, and a message distance vector for false messages. The method includes receiving a data message generated in accordance with the mission plan that includes a plurality of identity parameters. A message type and a message distance vector is determined for the received message. On a condition that the message type is a false message and the distance vector of the false message has been exhausted, the data message is dropped. On a condition that the distance vector of the false message has not been exhausted, transmitting the false message in accordance with the mission plan.

A network device for processing data messages is disclosed. The network device is connected to a first network. A plurality of ports on the network device are configured to receive and transmit data messages that include a plurality of identity parameters. A memory is configured to store a mission plan that specifies a message type, a message generation location, and a message distance vector for false messages. The device also includes at least one processing unit configured to generate a false message based on the mission plan. The processing unit is also configured to determine a message type and a message distance vector of a received data message. If the message type is a false message and the distance vector of the false message has been exhausted, the processing unit is configured to drop the data message. On the other hand, if the distance vector of the data message has not been exhausted, transmit the data message in accordance with the mission plan.

BRIEF DESCRIPTION OF THE DRAWINGS

Embodiments will be described with reference to the following drawing figures, in which like numerals represent like items throughout the figures, and in which:

FIG. 13 is a table that is useful for understanding some of the types of identity parameters that can be modified.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Identity Agile Computer Network

Figure 1:
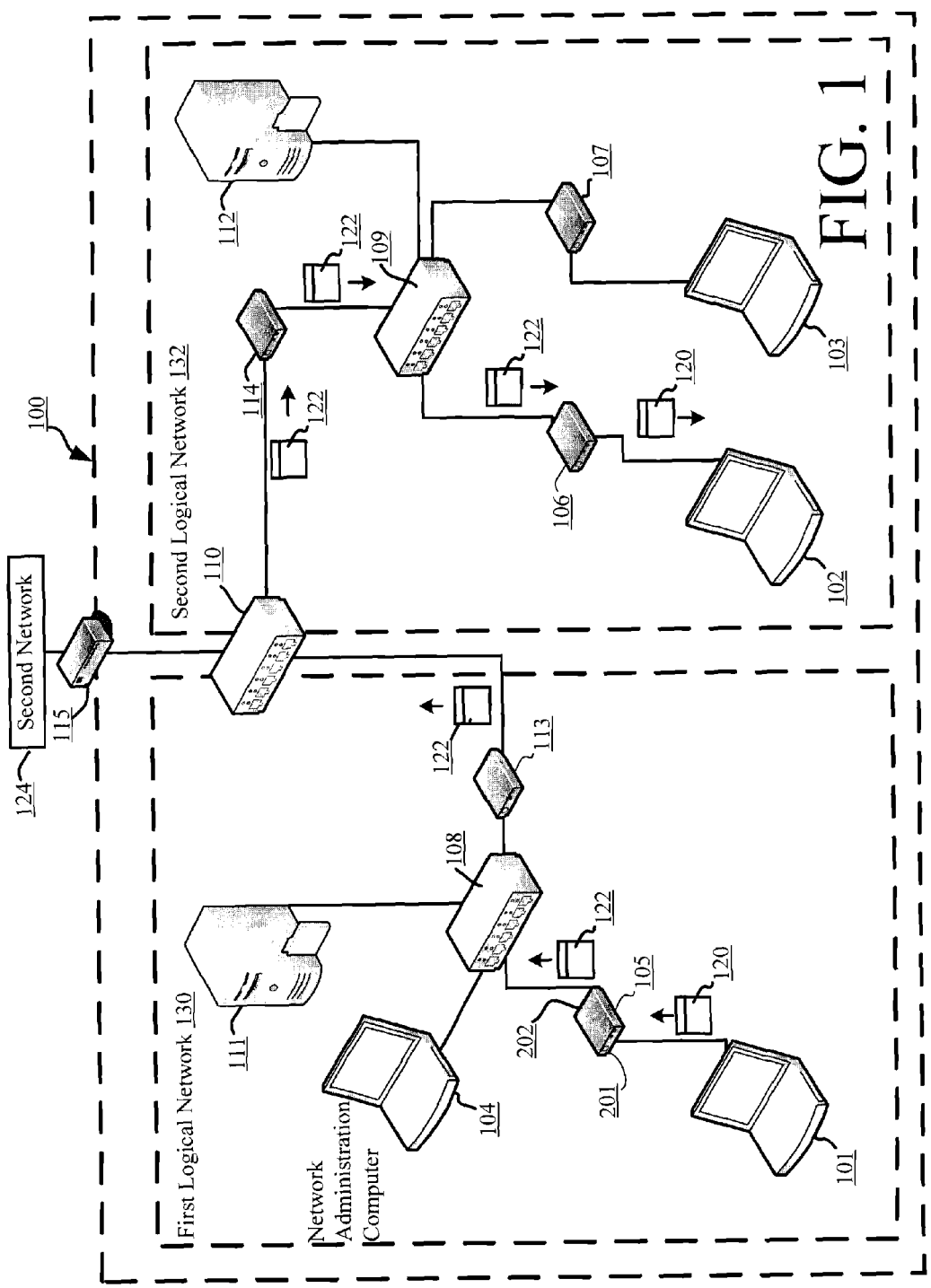
FIG. 1 is an example of a computer network that is useful for understanding the present invention.

Referring now to FIG. 1, there is shown a diagram of an exemplary network 100 which includes a plurality of computing devices. The computing devices can include client computers 101-103, network administration computer (NAC) 104, servers 111, 112, network hubs 108, 109, router 110, and a bridge 115. The client computers can be any type of computing device which might require network services, such as a conventional tablet, notebook, laptop or desktop computer. The router 110 can be a conventional routing device that routes data packets between computer networks. The hubs 108, 109 are conventional hub devices (e.g. an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the network 100 can be wired, wireless or both, but shall be described herein as a wired network for simplicity and to avoid obscuring the invention. The network will communicate data using a communication protocol. As is well known in the art, the communication protocol defines the formats and rules used for communicating data throughout the network. The network in FIG. 1 can use any communication protocol or combination of protocols which is now known or known in the future. For example, the network can use the well known Ethernet protocol suite for such communications. Alternatively, the network can make use of other protocols, such as the Internet Protocol Suite (often referred to as TCP/IP), SONET/SDH, or Asynchronous Transfer Mode (ATM) communication protocols. In some embodiments, one or more of these communication protocols can be used in combination. Although one network topology is shown in FIG. 1, the invention is not limited in this regard. Instead, any type of suitable network topology can be used, such as a bus network, a star network, a ring network or a mesh network.

The invention generally concerns a method for communicating data in a computer network (e.g. in computer network 100), where data is communicated from a first computing device to a second computing device. Computing devices within the network are represented with multiple identity parameters. The phrase "identity parameters" as used herein can include items such as an internet protocol (IP) address, media access control (MAC) address, ports and so on. However, the invention is not limited in this regard, and identity parameters can also include a variety of other information which is useful for characterizing a network node. The various types of identity parameters contemplated herein are discussed below in further detail. The inventive arrangement involve the use of moving target technology (MTT) to manipulate one or more of such identity parameters for one or more computing devices within the network. This technique disguises communication patterns and network address of such computing devices. The manipulation of identity parameters as described herein is generally performed in conjunction with data communications in the network, i.e. when data is to be communicated from a first computer in the network (e.g. client computer 101) to a second computer in the network (e.g. client computer 102). Accordingly, identity parameters that are manipulated can include those of a source computing device (the device from which the data originated) and the destination computing device (the device to which the data is being sent). The set of identity parameter that are communicated is referred to herein as an identity parameter set (IDP set). This concept is illustrated in FIG. 1, which shows that an IDP set 120 is transmitted by client computer 101 as part of a data packet (not shown).

The process according to the inventive arrangements involves selectively modifying at a first location within the computer network, values contained in a data packet or datagram which specify one or more identify parameters of a source and/or destination computing device. The identity parameters are modified in accordance with a mission plan. The location where such modification is performed will generally coincide with the location of one of the modules 105-107, 113, 114. Referring once again to FIG. 1, it can be observed that modules 105, 106, 107, 113, 114 are interposed in the network between the various computing devices which comprise nodes in such network. In these locations, the modules intercept data packet communications, perform the necessary manipulations of identity parameters, and retransmit the data packets along a transmission path. In alternative embodiments, the modules 105, 106, 107, 113, 114 can perform a similar function, but can be integrated directly into one or more of the computing devices. For example, the modules could be integrated into client computers 101, 102, 103, servers 111, 112, hubs 108, 109, bridge 115, and/or within router 110. Hubs 108, 109, bridge 115 and/or router 110 can also include a firewall that is capable of filtering traffic that includes a modified IDP set.

Additionally, network 100 can be divided into a number of logical subdivisions, sometimes referred to as sub-networks or subnets, connected through router 110. An enterprise network can be divided into a number of subnets for a variety of administrative or technical reasons including, but not limited to, hiding the topology of the network from being visible to external hosts, connecting networks utilizing different network protocols, separately administering network addressing schemes on the subnet level, enabling management of data traffic across subnets due to constrained data connections, and the like. Subnetting is well known in the art and will not be described in further detail.

Referring again to FIG. 1, network 100 is divided into two logical networks, a first logical network 130 and a second logical network 132. The phrase "logical network" as used herein refers to any logical subdivision of a computer network. In an embodiment, logical networks 130, 132 are connected through router 110. Router 110 is responsible for directing traffic between the logical networks, i.e. from client computer 101 to client computer 103. Router 110 is also responsible for directing traffic from any host connected to network 100 bound for second network 124. In the embodiment shown in FIG. 1, traffic routed from network 100 to second network 124 passes through bridge 115. As with the modules above, the functionality of the bridge 115 could be integrated within router 110 and/or include a firewall.

Figure 2:
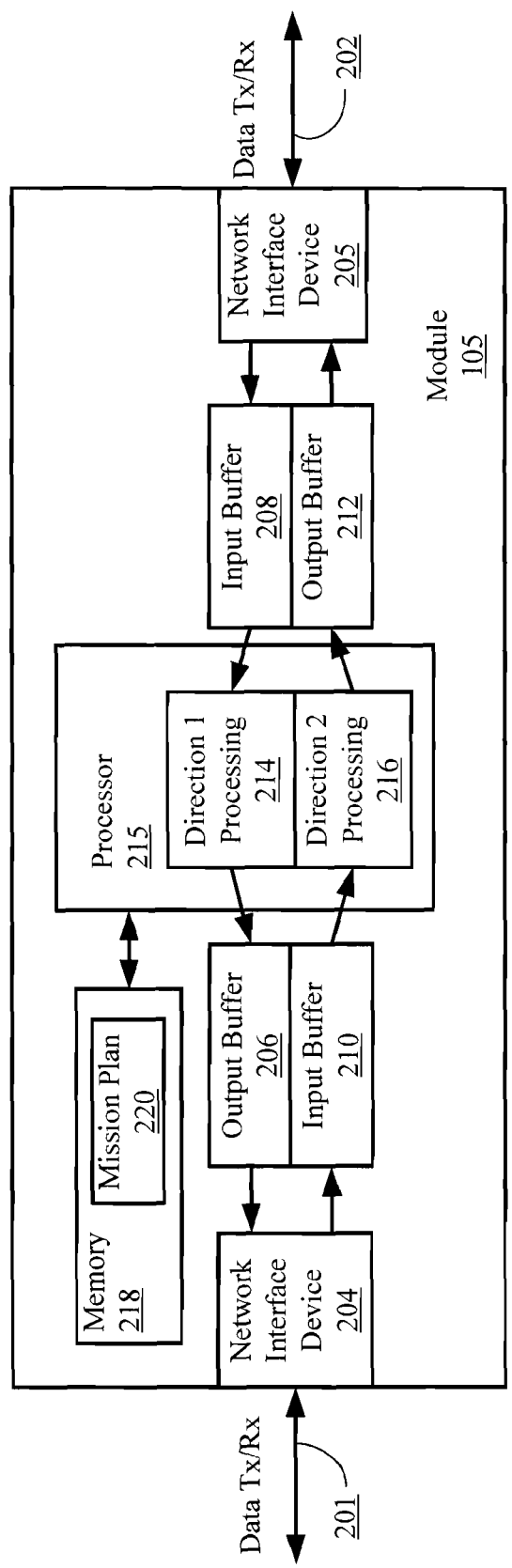
FIG. 2 is an example of a module that can be used in the present invention for performing certain manipulations of identity parameters.

A example of a functional block diagram of a module 105 is shown in FIG. 2. Modules 106-107, 113, 114 can have a similar functional block diagram, but it should be understood that the invention is not limited in this regard. As shown in FIG. 2, the module 105 has at least two data ports 201, 202, each of which can correspond to a respective network interface device 204, 205. Data received at port 201 is processed at network interface device 204 and temporarily stored at an input buffer 210. The processor 215 accesses the input data packets contained in input buffer 210 and performs any necessary manipulation of identity parameters as described herein. The modified data packets are passed to output buffer 212 and subsequently transmitted from port 202 using network interface device 205. Similarly, data received at port 202 is processed at network interface device 205 and temporarily stored at an input buffer 208. The processor 215 accesses the input data packets contained in input buffer 208 and performs any necessary manipulation of identity parameters as described herein. The modified data packets are passed to output buffer 206 and subsequently transmitted from port 201 using network interface device 204. In each module, manipulation of identity parameters is performed by processor 215 in accordance with a mission plan 220 stored in a memory 218.

It will be understood from FIG. 2 that a module is preferably configured so that it operates bi-directionally. In such embodiments, the module can implement different modification functions, depending on a source of a particular data packet. The dynamic modification function in each module can be specified in the mission plan in accordance with a source computing device of a particular data packet. Modules can determine a source of data packets by any suitable means. For example, a source address of a data packet can be used for this purpose.

At a selected module within the network 100, processor 215 will determine one or more false identity parameter values that are to be used in place of the true identity parameter values. The processor will transform one or more true identity parameter values to one or more false identity parameter values which are preferably specified by a pseudorandom function. Following this transformation, the module will forward the modified packet or datagram to the next node of the network along a transmission path. At subsequent points in the communication path, an adversary who is monitoring such network communications will observe false or incorrect information about the identity of computing devices communicating on the network.

In a preferred embodiment, the false identity parameters that are specified by the pseudorandom function are varied in accordance with the occurrence of one or more trigger events. The trigger event causes the processor 215 to use the pseudorandom function to generate a new set of false identity parameter values into which the true identity parameters are transformed. Accordingly, the trigger event serves as a basis for the dynamic variation of the false identity parameters described herein. Trigger events are discussed in more detail below. However it should be noted that trigger events for selecting a new set of false values for identity parameters can be based on the passage of time and/or the occurrence of certain network events. Trigger events can also be initiated by a user command.

The transformation of identity parameters described above provides one way to maneuver a computer network 100 for purposes of thwarting a cyber attack. In a preferred embodiment, the mission plan 220 implemented by processor 215 will also control certain other aspects of the manner in which computer network can maneuver. For example, the mission plan can specify that a dynamic selection of identity parameters are manipulated. The dynamic selection can include a choice of which identity parameters are selected for modification, and/or a number of such identity parameters that are selected. This variable selection process provides an added dimension of uncertainty or variation which can be used to further thwart an adversary's effort to infiltrate or learn about a computer network 100. As an example of this technique, consider that during a first time period, a module can modify a destination IP address and a destination MAC address of each data packet. During a second time period the module could manipulate the source IP address and a source host name in each data packet. During a third period of time the module could manipulate a source port number and a source user name. Changes in the selection of identity parameters can occur synchronously (all selected identity parameters are changed at the same time). Alternatively, changes in the selection of identity parameters can occur asynchronously (the group of selected identity parameters changes incrementally as individual identity parameters are added or removed from the group of selected identity parameters).

A pseudorandom function is preferably used for determining the selection of identity values that are to be manipulated or transformed into false values. In other words, the module will transform only the identity parameters selected by the pseudo-random function. In a preferred embodiment, the selection of identity parameters that are specified by the pseudorandom function is varied in accordance with the occurrence of a trigger event. The trigger event causes processor 215 use a pseudorandom function to generate a new selection of identity parameters which are to be transformed into false identity parameters. Accordingly, the trigger event serves as a basis for the dynamic variation of the selection of identity parameters described herein. Notably, the values of the identity parameters can also be varied in accordance with pseudorandom algorithm.

The modules are advantageously capable of also providing a third method of maneuvering the computer network for purposes of thwarting a cyber attack. Specifically, the mission plan loaded in each module can dynamically vary the location within the network where the modification or transformation of the identity parameters takes place. Consider that modification of identity parameters in an IDP set 120 sent from client computer 101 to client computer 102, could occur in module 105. This condition is shown in FIG. 1, where the identity parameters contained in IDP set 120 are manipulated in module 105 so that IDP set 120 is transformed to a new or modified IDP set 122. At least some of the identity parameters in IDP set 122 are different as compared to the identity parameters in IDP set 120. But the location where such transformation occurs is preferably also controlled by the mission plan. Accordingly, manipulation of IDP set 120 could, for example, sometimes occur at module 113 or 114, instead of at module 105. This ability to selectively vary the location where manipulation of identity parameters occurs adds a further important dimension to the maneuvering capability of the computer network.

The dynamic variation in the location where identity parameters are modified is facilitated by selectively controlling an operating state of each module. To that end, the operational states of each module preferably includes (1) an active state in which data is processed in accordance with a current mission plan, and (2) a by-pass state in which packets can flow through the module as if the module was not present. The location where the dynamic modification is performed is controlled by selectively causing certain modules to be in an active state and certain modules to be in a standby state. The location can be dynamically changed by dynamically varying the current state of the modules in a coordinated manner.

The mission plan can include predefined sequence for determining the locations within the computer network 100 where identity parameters are to be manipulated. Locations where identity parameters are to be manipulated will change in accordance with the sequence at times indicated by a trigger event. For example, the trigger event can cause a transition to a new location for manipulation or transformation of identity parameters as described herein. Accordingly, the trigger event serves as a basis for the occurrence of a change in the location where identity parameters are modified, and the predefined sequence determines where the new location will be.

From the foregoing, it will be appreciated that a data packet is modified at a module to include false identity parameters. At some point within the computer network, it is necessary to restore the identity parameters to their true values, so that the identity parameters can be used to properly perform their intended function in accordance with the particular network protocol. Accordingly, the inventive arrangements also includes dynamically modifying, at a second location (i.e. a second module), the assigned values for the identity parameters in accordance with the mission plan. The modification at the second location essentially comprises an inverse of a process used at the first location to modify the identity parameters. The module at the second location can thus restore or transform the false value identity parameters back to their true values. In order to accomplish this action, the module at the second location must be able to determine at least (1) a selection of identity parameter value that are to be transformed, and (2) a correct transformation of the selected identity parameters from false values to true values. In effect, this process involves an inverse of the pseudorandom process or processes used to determine the identity parameter selection and the changes effected to such identity parameter values. The inverse transformation step is illustrated in FIG. 1, where the IDP set 122 is received at module 106, and the identity parameter values in IDP set 122 are transformed or manipulated back to their original or true values. In this scenario, module 106 converts the identity parameters values back to those of IDP set 120.

Notably, a module must have some way of determining the proper transformation or manipulation to apply to each data communication it receives. In a preferred embodiment, this determination is performed by examining at least a source address identity parameter contained within the received data communication. For example, the source address identity parameter can include an IP address of a source computing device. Once the true identity of the source computing device is known, the module consults the mission plan (or information derived from the mission plan) to determine what actions it needs to take. For example, these actions could include converting certain true identity parameter values to false identity parameter values. Alternatively, these changes could include converting false identity parameter values back to true identity parameter values.

Notably, there will be instances where the source address identity parameter information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address identity parameter value to a look-up-table (LUT) which lists all such false source address identity parameter values in use during a particular time. The LUT also includes a list of true source address identity parameter values that correspond to the false source address values. The LUT can be provided directly by the mission plan or can be generated by information contained within the mission plan. In either case, the identification of a true source address identity parameter value can be easily determined from the LUT. Once the true source address identity parameter has been determined, then the module which received the data communication can use this information to determine (based on the mission plan) what manipulations to the identity parameters are needed.

Notably, the mission plan can also specify a variation in the second location where identity parameters are restored to their true values. For example, assume that the identity parameters are dynamically modified at a first location comprising module 105. The mission plan can specify that the restoration of the identity parameters to their true values occurs at module 106 as described, but can alternatively specify that dynamic modification occur instead at module 113 or 114. In some embodiments, the location where such manipulations occur is dynamically determined by the mission plan in accordance with a predefined sequence. The predefined sequence can determine the sequence of locations or modules where the manipulation of identity parameters will occur.

The transition involving dynamic modification at different locations preferably occurs in accordance with a trigger event. Accordingly, the predefined sequence determines the pattern or sequence of locations where data manipulations will occur, and the trigger event serves as a basis for causing the transition from one location to the next. Trigger events are discussed in more detail below; however, it should be noted that trigger events can be based on the passage of time, user control, and/or the occurrence of certain network events. Control over the choice of a second location (i.e. where identity parameters are returned to their true values) can be effected in the same manner as described above with regard to the first location. Specifically, operating states of two or more modules can be toggled between an active state and a bypass state. Manipulation of identity parameters will only occur in the module which has an active operating state. The module with a bypass operating state will simply pass data packets without modification.

Alternative methods can also be used for controlling the location where manipulation of identity parameters will occur. For example, a network administrator can define in a mission plan several possible modules where a identity parameters can be converted from true values to false values. Upon the occurrence of a trigger event, a new location can be selected from among the several modules by using a pseudorandom function, and using a trigger time as a seed value for the pseudorandom function. If each module implements the same pseudorandom function using the same initial seed values then each module will calculate the same pseudorandom value. The trigger time can be determined based on a clock time, such as a GPS time or system clock time). In this way, each module can independently determine whether it is currently an active location where manipulation of identity parameters should occur. Similarly, the network administrator can define in a mission plan several possible modules where dynamic manipulation returns the identity parameters to their correct or true values. The selection of which module is used for this purpose can also be determined in accordance with a trigger time and a pseudorandom function as described herein. Other methods are also possible for determining the location or module where identity parameter manipulations are to occur. Accordingly, the invention is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different position for the first and second locations within the network can have the effect of changing the number of nodes between the first and second locations. For example, in FIG. 1 the dynamic modification of identity parameters are implemented in selected ones of the modules 105, 106, 107, 113, 114. The modules actually used to respectively implement the dynamic modification is determined as previously described. If module 105 is used for converting identity parameters to false values and module 106 is used to convert them back to true values, then there are three network nodes (108, 110, 109) between modules 105 and 106. But if module 113 is used to convert identity to false values and module 114 is used to convert the identity parameters back to true values, then there is only one network node (110) between modules 113 and 114. Accordingly, it will be appreciated that dynamically changing the position of locations where dynamic modification occurs can dynamically vary the distance vector. This variation of the distance vector provides an added dimension of variability to network maneuvering or modification as described herein.

In the present invention, the manipulation of identity parameter values, the selection of identity parameters, and the locations where these identity parameters is each defined as a maneuvering parameter. Whenever a change occurs in one of these three maneuvering parameters, it can be said that a network maneuver has occurred. Any time one of these three maneuvering parameters is changed, we can say that a network maneuver has occurred. In order to most effectively thwart an adversary's efforts to infiltrate a computer network 100, network maneuvering is preferably controlled by means of a pseudorandom process as previously described. Those skilled in the art will appreciate that a chaotic process can also be used for performing this function. Chaotic processes are technically different as compared to pseudorandom functions, but for purposes of the present invention, either can be used, and the two are considered equivalent. In some embodiments, the same pseudorandom process can be used for dynamically varying two or more of the maneuvering parameters. However, in a preferred embodiment of the invention, two or more different pseudorandom processes are used so that two or more of these maneuvering parameters are modified independently of the others.

Trigger Events

As noted above, the dynamic changes to each of the maneuvering parameters is controlled by at least one trigger. A trigger is an event that causes a change to occur in relation to the dynamic modifications described herein. Stated differently, it can be said that the trigger causes the network to maneuver in a new way that is different than at a previous time (i.e. before the occurrence of the trigger). For example, during a first period of time, a mission plan can cause an IP address can be changed from value A to value B; but after the trigger event, the IP address can instead be changed from value A to value C. Similarly, during a first period of time a mission plan can cause an IP and MAC address to be modified; but after the trigger event, the mission plan can instead cause a MAC address and user name to be modified. As a third example, consider that during a first period of time a mission plan may cause identity parameters to be changed when an IDP set 120 arrives at module 105; but after the trigger event, can cause the identity parameters to instead be changed when and IDP set 120 arrives at module 113.

In its simplest form a trigger can be user activated or based on a simple timing scheme. In such an embodiment, a clock time in each module could serve as a trigger. For example, a trigger event could be defined as occurring at the expiration of every 60 second time interval. For such an arrangement, one or more of the maneuvering parameters could change every 60 seconds in accordance with a predetermined clock time. In some embodiments, all of the maneuvering parameters can change concurrently so that the changes are synchronized. In a slightly more complex embodiment, a time-based trigger arrangement can also be used, but a different unique trigger time interval can be selected for each maneuvering parameter. Thus, false identity parameter values could be changed at time interval X, a selection of identity parameters would change in accordance with a time interval Y, and a location where such changes are performed would occur at time interval Z, where X, Y and Z are different values.

It will be appreciated that in embodiments of the invention which rely upon clock time as a trigger mechanism, it is advantageous to provide synchronization as between the clocks in various modules 105, 106, 107, 113, 114 to ensure that packets are not lost or dropped due to unrecognized identity parameters. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

Other types of triggers are also possible with the present invention. For example, trigger events can be based on the occurrence or detection of potential network security threats. According to an embodiment of the invention, a potential network security threat can be identified by a network security software suite. Alternatively, the potential network security threat can be identified upon the receipt of a data packet at a module 105, 106, 107, 113, 114 where the packet contains one or more identity parameters that are inconsistent with the present state of network maneuvering. Regardless of the basis for identifying a network security threat, the existence of such threat can serve as a trigger event. A trigger event based on a network security threat can cause the same types of network maneuvers as those caused by the time based triggers described above. For example, false identity parameters, the selection of identity parameters and the locations of identity parameter transformations could remain stable (i.e. unchanged) except in the case were a network security threat was detected. Such an arrangement might be chosen, for example, in computer networks where frequent network maneuvering is not desirable.

Alternatively, time based trigger events can be combined with trigger events based on potential threats to network security. In such embodiments, a trigger event based on a security threat can have a different effect on the network maneuvering as compared to time based triggers. For example, a security threat-based trigger event can cause strategic or defensive changes in the network maneuvering so as to more aggressively counter such network security threat. The precise nature of such measures can depend on the nature of the threat, but can include a variety of responses. For example, different pseudorandom algorithms can be selected, and/or the number of identity parameters selected for manipulation in each IDP set 120 can be increased. In systems that already make use of time based triggers, the response can also include increasing a frequency of network maneuvering. Thus, more frequent changes can be made with respect to (1) the false identity parameter values, (2) the selection of identity parameters to be changed in each IDP set, and/or (3) the position of the first and second locations where identity parameters are changed. Accordingly, the network maneuvering described herein provides a method for identifying potential network security threats and responding to same.

Mission Plans

According to a preferred embodiment of the invention, the network maneuvering described herein is controlled in accordance with a mission plan. A mission plan is a schema that defines and controls maneuverability within the context of a network and a security model. As such, the mission plan can be represented as a data file that is communicated from the network administration computer (NAC) 104 to each module 105-107, 113-114. The mission plan is thereafter used by each module to control the manipulation of identity parameters and coordinate its activities with the actions of the other modules in the network.

According to a preferred embodiment, the mission plan can be modified from time to time by a network administrator to update or change the way in which the network maneuvers to thwart potential adversaries. As such, the mission plan provides a network administrator with a tool that facilitates complete control over the time, place and manner in which network maneuvering will occur within the network. Such update ability allows the network administrator to tailor the behavior of the computer network to the current operating conditions and more effectively thwart adversary efforts to infiltrate the network. Multiple mission plans can be defined by a user and stored so that they are accessible to modules within the network. For example, the multiple mission plans can be stored at NAC 104 and communicated to modules as needed. Alternatively, a plurality of mission plans can be stored on each module and can be activated as necessary or desirable to maintain security of the network. For example, if the network administrator determines or suspects that an adversary has discovered a current mission plan for a network, the administrator may wish to change the mission plan. Effective security procedures can also dictate that the mission plan be periodically changed.

Figure 3:
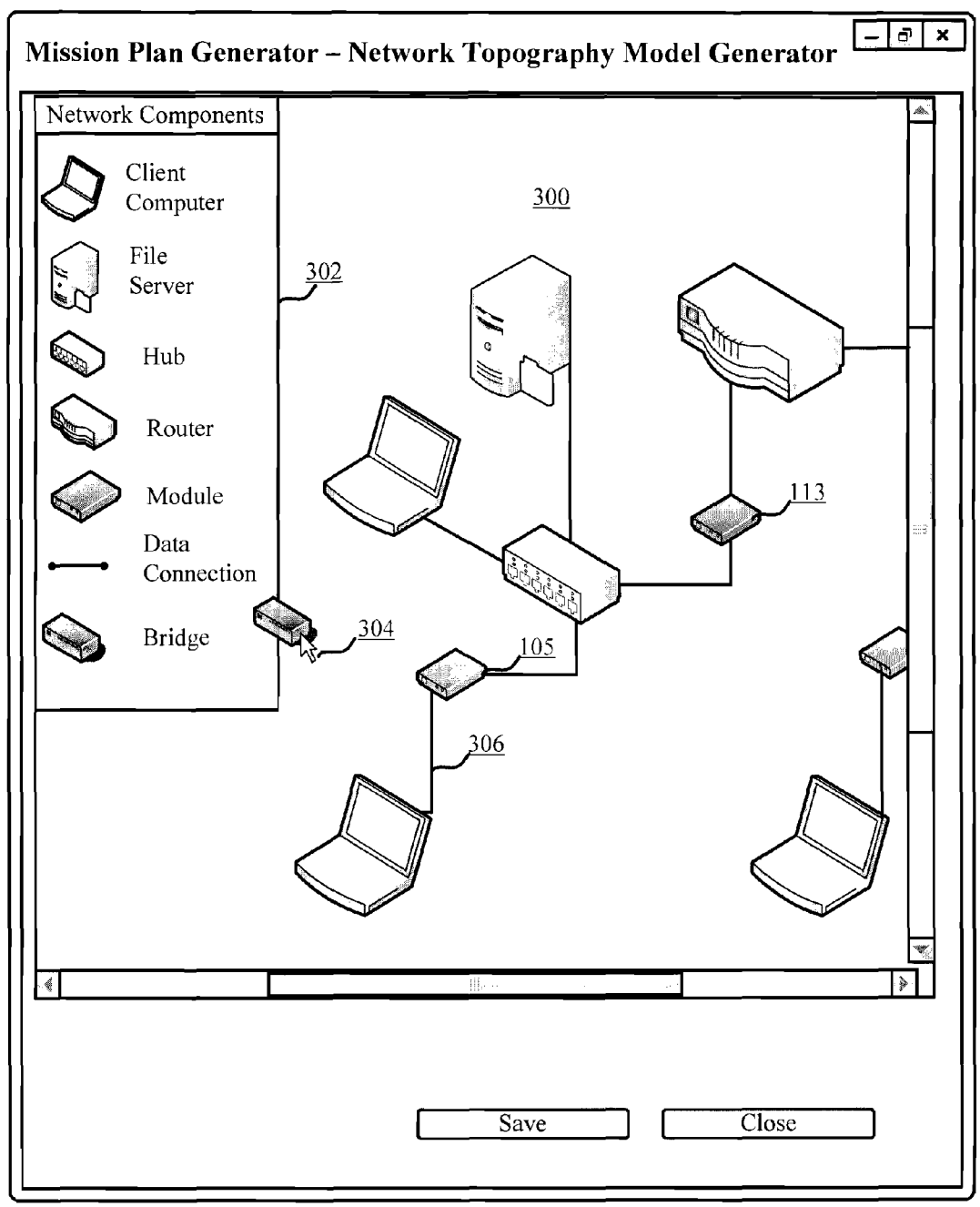
FIG. 3 is a drawing that is useful for understanding a tool that can be used to help characterize the network in FIG. 1.

The process of creating a mission plan can begin by modeling the network 100. The creation of the model is facilitated by a network control software application (NCSA) executing on a computer or server at the network command center. For example, in the embodiment shown in FIG. 1, the NCSA can execute on NAC 104. The network model preferably includes information which defines data connections and/or relationships between various computing devices included in the network 100. The NCSA will provide a suitable interface which facilitates entry of such relationship data. According to one embodiment, the NCSA can facilitate entry of data into tables which can be used to define the mission plan. However, in a preferred embodiment, a graphic user interface is used to facilitate this process. Referring now to FIG. 3, the NCSA can include a network topography model generator tool. The tool is used to assist the network administrator in defining the relationship between each of the various components of the networks. The network topography tool provides a workspace 300 in which an administrator can drag and drop network components 302, by using a cursor 304. The network administrator can also create data connections 306 between various network components 302. As part of this modeling process, the network administrator can provide network address information for the various network components, including the modules 105-107, 113, 114.

Figure 4:
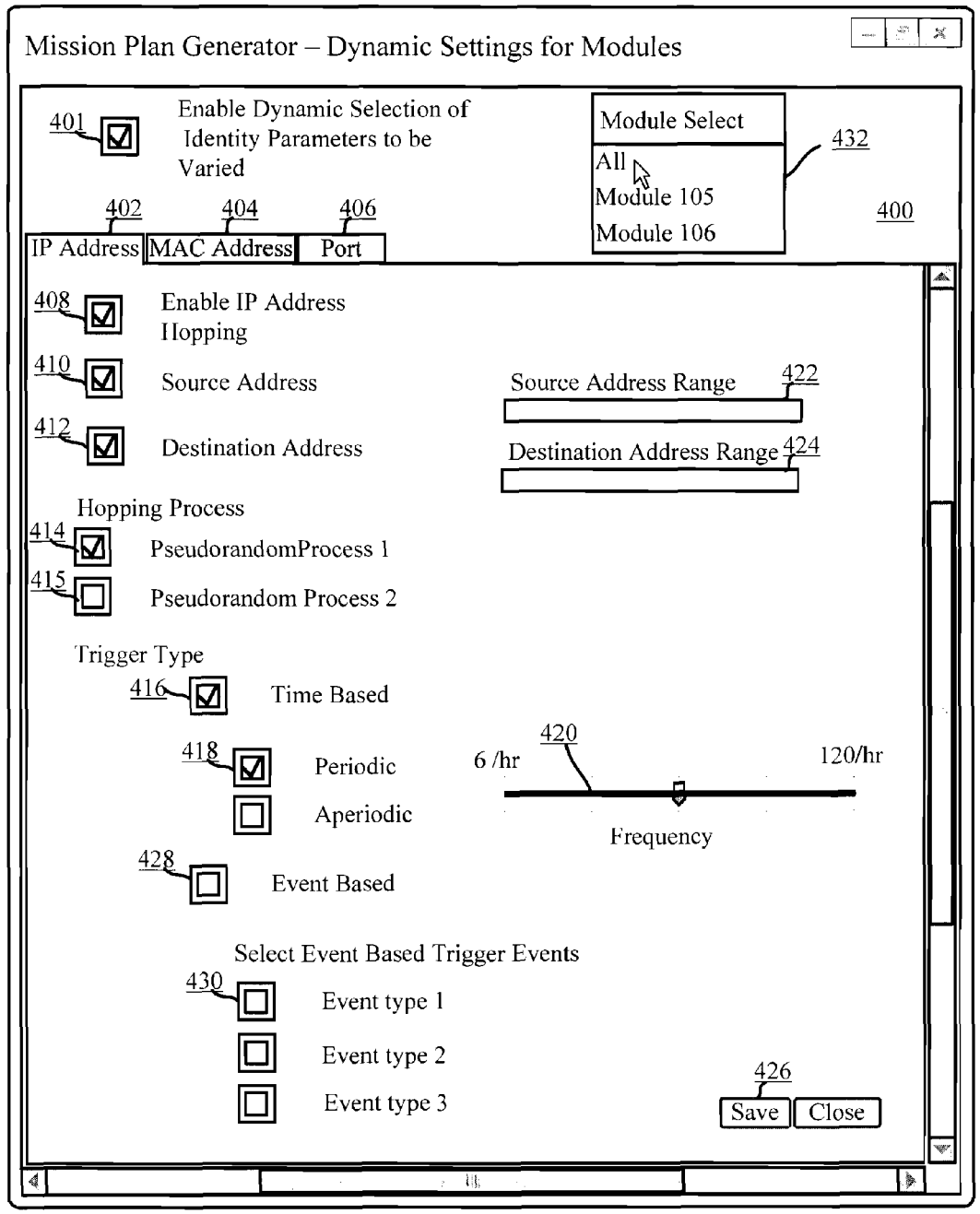
FIG. 4, is an example of a dialog box of a graphical user interface that can be used to select dynamic settings for modules in FIG. 1.

Once the network has been modeled, it can be saved and used by the network administrator to define the manner in which the various modules 105-107, 113, 114 behave and interact with one another. Referring now to FIG. 4, the NCSA can generate a dialog box 400 of which can be used to further develop a mission plan. A drop-down menu 432 can be used to select the particular module (e.g. module 105) to which the settings in dialog box 400 are to be applied. Alternatively, the network administrator can use drop-down menu 432 to indicate that the settings in dialog box 400 are intended to be applied to all modules within the network (e.g. by selecting "All" in menu 432). The process can continue by specifying whether a fixed set of identity parameters will always be modified in each of the modules, or whether the set of identity parameters that are manipulated shall be dynamically varied. If the selection or set of identity parameters that are to be manipulated in the modules is intended to be dynamically varied, the network administrator can mark check-box 401 to indicate that preference. If the check-box 401 is not marked, that will indicate that the set of identity parameters to be varied is a fixed set that does not vary over time.

The dialog box 400 includes tabs 402, 404, 406 which allow a user to select the particular identity parameter that he wants to work with for purposes of creating a mission plan. For purposes of this disclosure, the dialog box 400 facilitates dynamic variation of only three identity parameters. Specifically, these include the IP address, MAC address and Port Address. More or fewer identity parameters can be dynamically varied by providing additional tabs, but the three identity parameters noted are sufficient to explain the inventive concepts. In FIG. 4, the user has selected the tab 402 to work with the IP Address type of identity parameter. Within tab 402, a variety of user interface controls 408-420 are provided for specifying the details relating to the dynamic variation of IP addresses within the selected module. More or fewer controls can be provided to facilitate the dynamic manipulation of the IP Address type, and the controls shown are merely provided to assist the reader in understanding the concept. In the example shown, the network administrator can enable dynamic variation of IP addresses by selecting (e.g. with a pointing device such as a mouse) the check-box 408 marked: Enable IP Address Hopping. Similarly, the network administrator can indicate whether the source address, destination address or both are to be varied. In this example, the source and destination address boxes 410, 412 are both marked, indicating that both types of addresses are to be changed. The range of allowed values for the source and destination addresses can be specified by the administrator in list boxes 422, 424.

The particular pseudorandom process used to select false IP address values is specified by selecting a pseudorandom process. This selection is specified in boxes 414, 415. Different pseudorandom processes can have different levels of complexity for variable degrees of true randomness, and the administrator can choose the process that best suits the needs of the network 100.

Dialog box 400 also allows a network administrator to set the trigger type to be used for the dynamic variation of the IP Address identity parameter. In this example, the user has selected box 416, indicating that a time based trigger is to be used for determining when to transition to new false IP address values. Moreover, checkbox 418 has been selected to indicate that the time based trigger is to occur on a periodic basis. Slider 420 can be adjusted by the user to determine the frequency of the periodic time based trigger. In the example shown, the trigger frequency can be adjusted between 6 trigger occurrences per hour (trigger every 10 minutes) and 120 trigger occurrences per hour (trigger every 30 seconds). In this example, selections are available for other types of triggers as well. For example, dialog box 402 includes check boxes 428, 430 by which the network administrator can select an event-based trigger. Several different specific event types can be selected to form the basis for such event-based triggers (e.g. Event type 1, Event type 2, etc.). These event types can include the detection of various potential computer network security threats. In FIG. 4, tabs 404 and 406 are similar to tab 402, but the controls therein are tailored to the dynamic variation of the MAC Address and Port value rather than the IP Address. Additional tabs could be provided for controlling the dynamic variation of other types of identity parameters.

The mission plan can also specify a plan for dynamically varying the location where identity parameters are modified. In some embodiments, this variable location feature is facilitated by controlling a sequence that defines when each module is in an active state or a bypass state. Accordingly, the mission plan advantageously includes some means of specifying this sequence. In some embodiments of the invention, this can involve the use of defined time intervals or time slots, which are separated by the occurrence of a trigger event.

Figure 5:
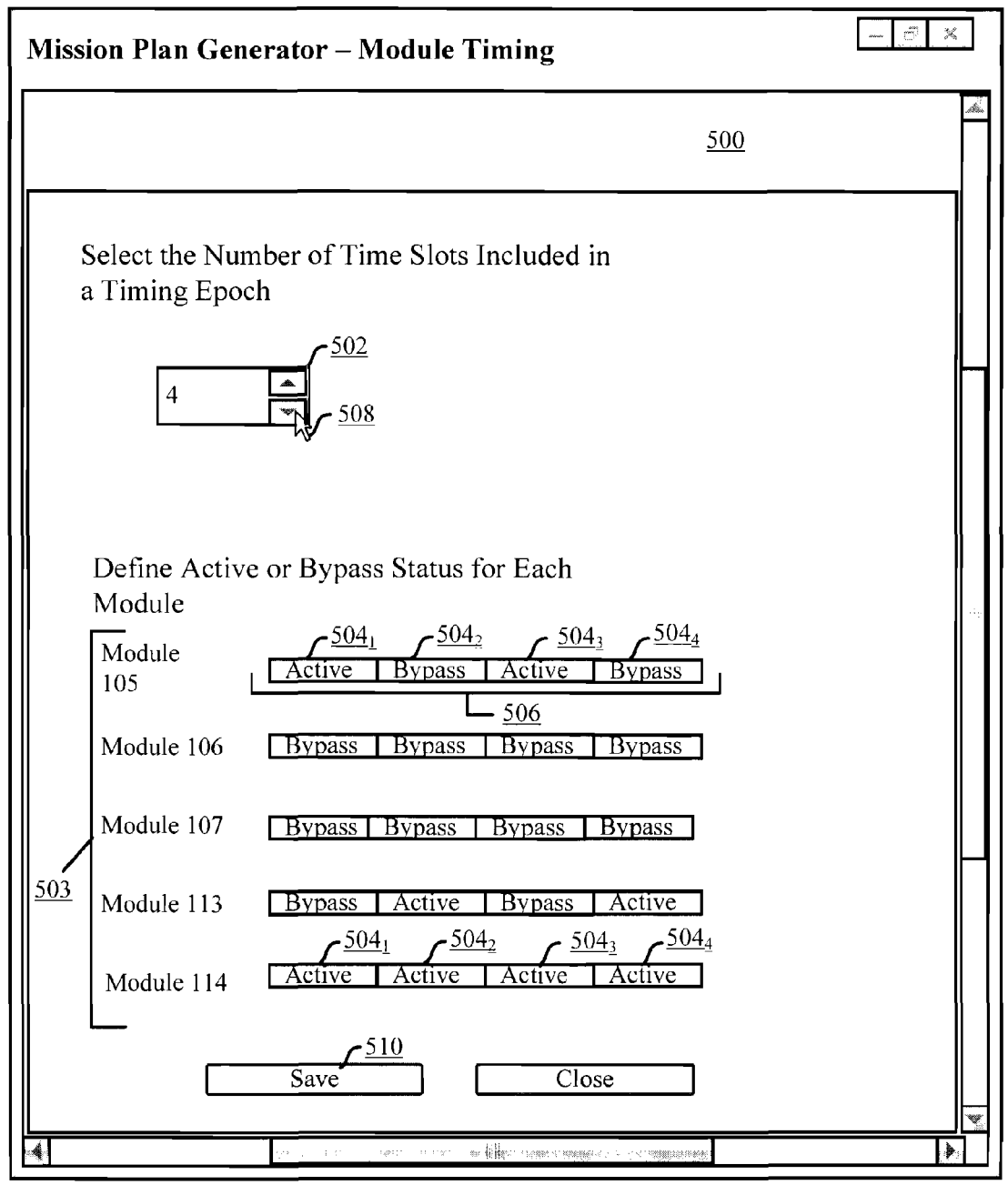
FIG. 5 is an example of a dialog box of a graphical user interface that can be used to select a sequence of active states and bypass states associated with each module in FIG. 1.

Referring now to FIG. 5, a dialog box 500 can be provided by the NCSA to facilitate coordination and entry of location sequence and timing information. Dialog box 500 can include a control 502 for selecting a number of time slots $504_1$-$504_n$ which are to be included within a time epoch 506. In the example illustrated, the network administrator has defined 4 time slots per timing epoch. The dialog box 500 can also include a table 503 which includes all modules in the network 100. For each module listed, the table includes a graphical representation of available time slots $504_1$-$504_4$ for one timing epoch 506. Recall that dynamic control over the location where identity parameters are manipulated is determined by whether each module is in an active or bypass operating states. Accordingly, within the graphical user interface, the user can move a cursor 508 and make selections to specify whether a particular module is in an active or bypass mode during each time slot. In the example shown, module 105 is active during time slot $504_1$ and $504_3$, but is in a bypass mode during time slots $504_2$, $504_4$. Conversely, module 113 is active during time slots $504_2$, $504_4$, but is in bypass mode during time slots $504_1$ and $504_3$. With reference to FIG. 1, this means that manipulation of identity parameters occurs at a location associated with module 105 during time slots slot $504_1$ and $504_3$, but occurs instead at module 113 during time slots $504_2$, $504_4$.

In the example shown in FIG. 5, the network administrator has elected to have module 114 always operate in an active mode (i.e. module 114 is active during all time slots. Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $504_1$-$504_4$. Accordingly, no manipulation of identity parameters will be performed at these modules during any of the defined time slots. Once the module timing has been defined in dialog box 500, the network administrator can select the button 510 to store the changes as part of an updated mission plan. The mission plan can be saved in various formats. In some embodiments, the mission plan can be saved as a simple table or other type of defined data structure that can be used by each module for controlling the behavior of the module.

Distribution and Loading of Mission Plans

The distribution and loading of mission plans as disclosed herein will now be described in further detail. Referring once again to FIG. 1, it can be observed that the modules 105-107, 113, 114 are distributed throughout the network 100 at one or more locations. The modules are integrated within the communications pathways to intercept communications at such locations, perform the necessary manipulations, and forward data to other computing devices within the network. With the foregoing arrangement, any necessary maintenance of the modules described herein (e.g. maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module preferably has several operating states. These operating states include (1) an off state in which the module is powered down and does not process any packets, (2) an initialization state in which the module installs software scripts in accordance with the mission plan, (3) an active state in which data is processed in accordance with a current mission plan, and (4) a by-pass state in which packets can flow through the module as if the module was not present. The module is configured so that, when it is in the active state or the by-pass state, the module can receive and load an updated mission plan provided by a network administrator. The module operating states can be manually controlled by the network administrator by means of the NCSA executing, for example, on NAC 104. For example, the user can select operating states for various modules through the use of a graphical user interface control panel. Commands for controlling the operating states of the network are communicated over the network 100, or can be communicated by any other suitable means. For example, a separate wired or wireless network (not shown) can be used for that purpose.

Figure 6:
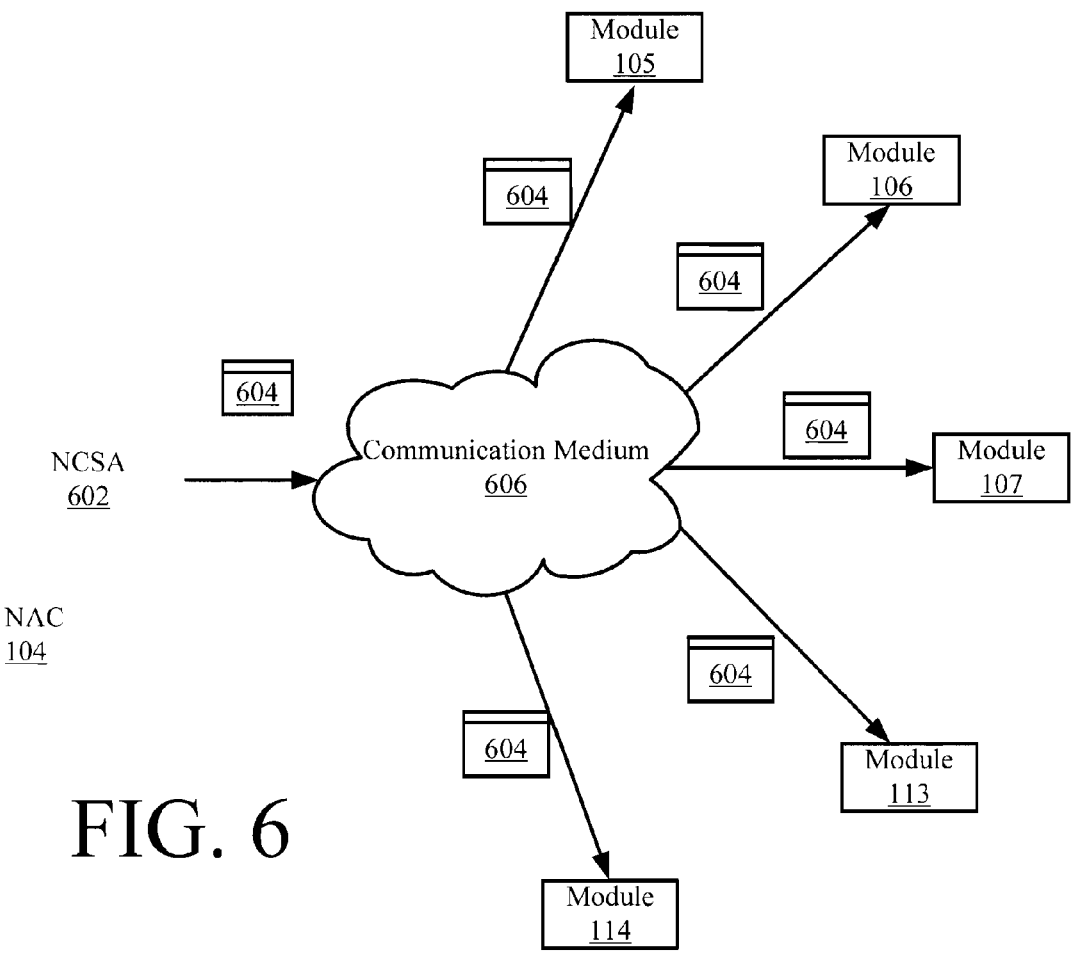
FIG. 6 is a diagram that is useful for understanding the way in which a mission plan can be communicated to a plurality of modules in the network in FIG. 1.
Figure 7:
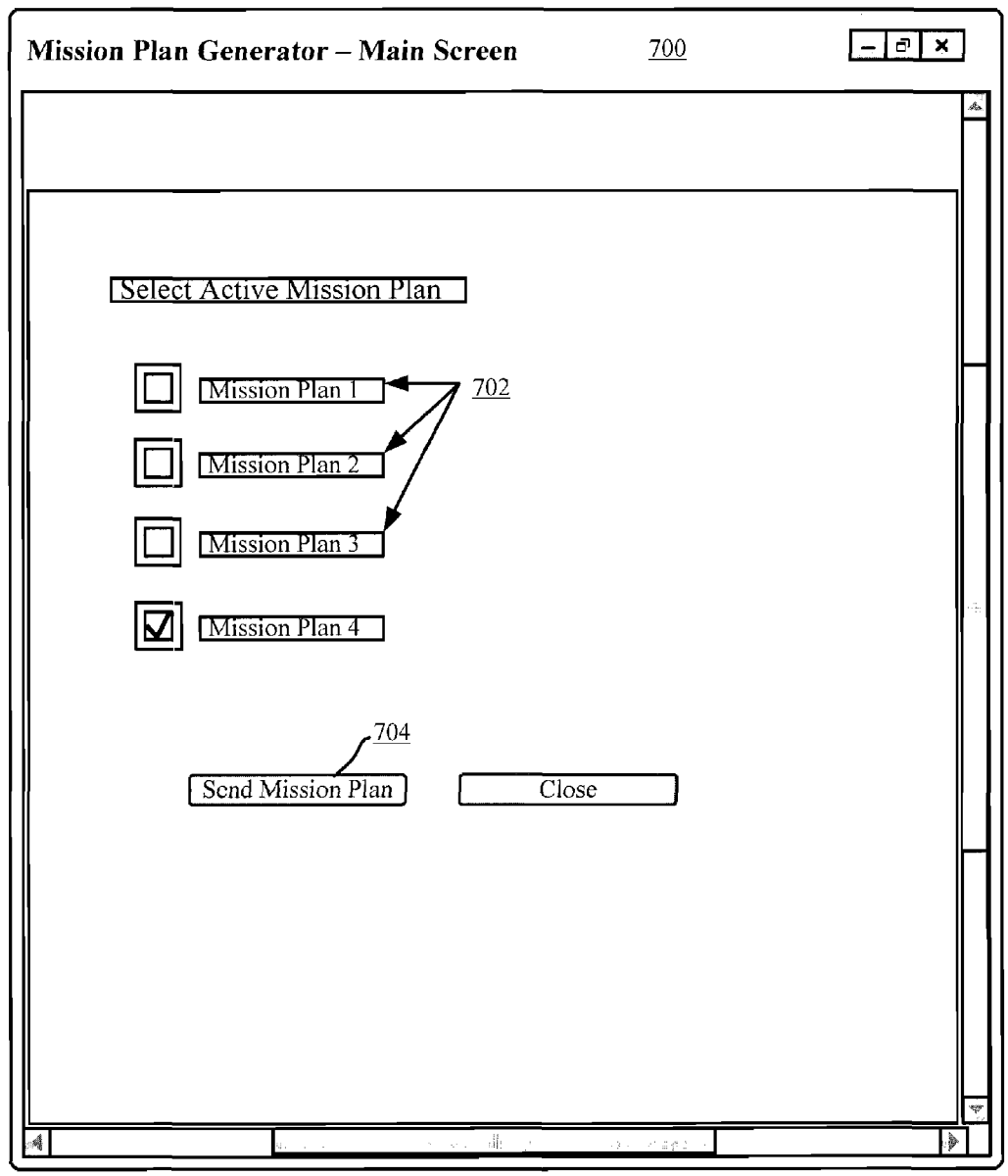
FIG. 7 is an example of a dialog box of a graphical user interface that can be used to select a mission plan and communicate the mission plan to the modules as shown in FIG. 6.

The mission plan can be loaded directly at the physical location of each module, or it can be communicated to the module from the NCSA. This concept is illustrated in FIG. 6, which shows mission plans 604 being communicated from NCSA 602 to each of the modules 105-107, 113, 114 over a communication medium 606. In the example shown, the NCSA software application is executing on NAC 104 operated by a network administrator. The communication medium can in some embodiments include in-band signaling using computer network 100. Alternatively, an out-of-band network (e.g. a separate wireless network) can be used as the communication medium 606 to communicate the updated mission plan from the NCSA to each module. As shown in FIG. 7, the NCSA can provide a dialog box 700 to facilitate selection of one of several mission plans 702. Each of these mission plans 702 can be stored on NAC 104. The network administrator can select from one of the several mission plans 702, after which they can activate a Send Mission Plan button 704. Alternatively, a plurality of mission plans can be communicated to each module and stored there. In either scenario, the user can choose one of the defined mission plans to activate.

In response to the command to send the mission plan, the selected mission plan is communicated to the modules while they are in an active state in which they are configured for actively performing dynamic modification of identity parameters as described herein. Such an arrangement minimizes the time during which the network operates in the clear and without manipulating identity parameters. However, the updated mission plan can also be communicated to the modules while they are in the by-pass mode, and this approach may be desirable in certain cases.

Once the mission plan is received by a module, it is automatically stored in a memory location within the module. Thereafter, the module can be caused to enter the by-pass state and, while still in that state, the module can load the data associated with the new mission plan. This process of entering into the by-pass state and loading the new mission plan data can occur automatically in response to receipt of the mission plan, or can occur in response to a command from the NCSA software controlled by the network administrator. The new mission plan preferably includes changes in the way that identity parameter values are varied. Once the new mission plan has been loaded, the modules 105-107, 113, and 114 can be transitioned from the by-pass mode to the active mode in a synchronized way to ensure that data communication errors do not occur. The mission plan can specify a time when the modules are to return to the active mode, or the network administrator can use the NCSA to communicate a command to the various modules, directing them to enter into the active mode. The foregoing process of updating a mission plan advantageously allows changes in network security procedures to occur without disrupting communication among the various computing devices attached to the computer network 100.

The dynamic manipulation of various identity parameters at each module 105, 106, 107, 113, and 114 is preferably controlled by the application software executing on each module 105-107, 113, 114. However, the behavior of the application software is advantageously controlled by the mission plan.

Figure 8:
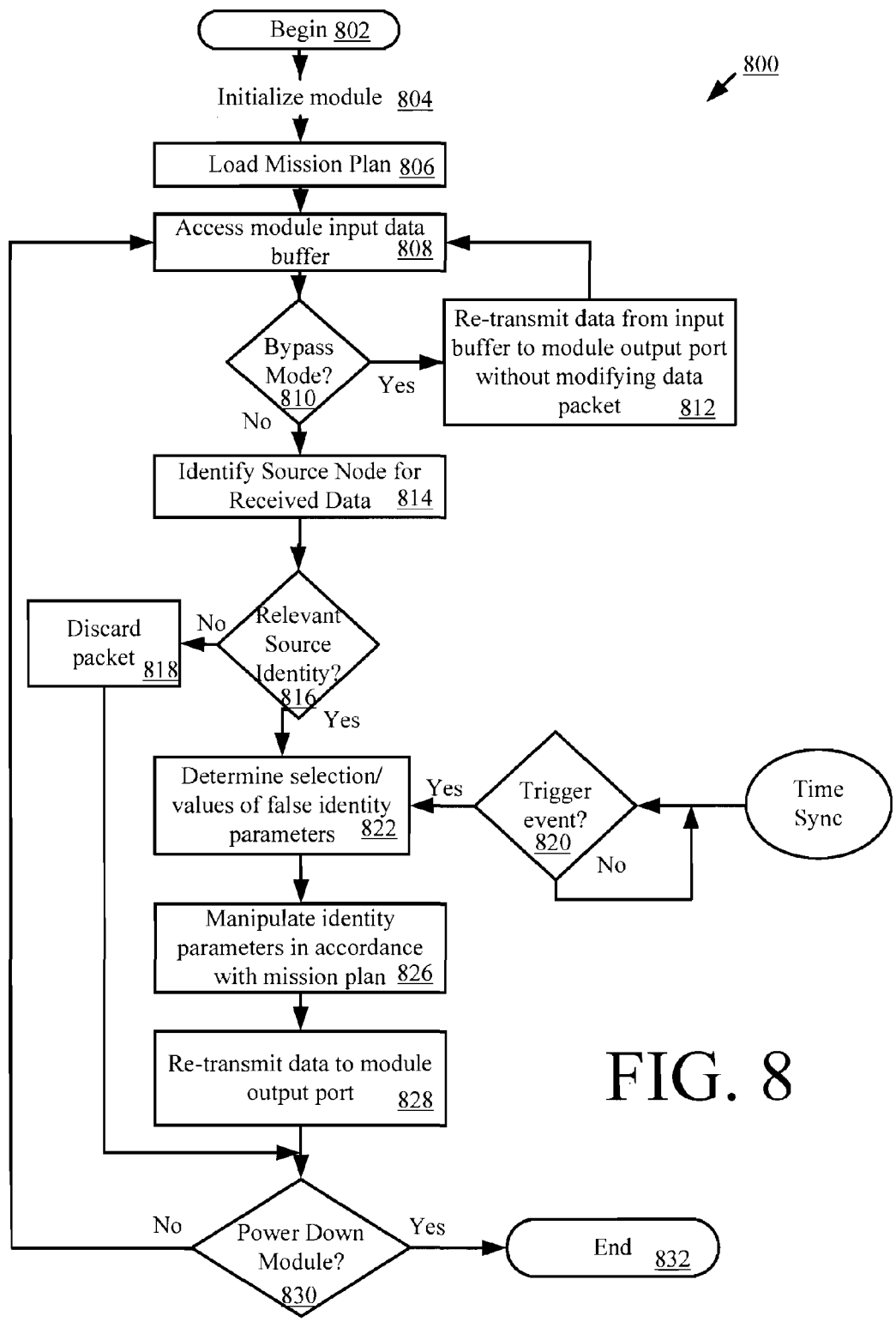
FIG. 8 is a flowchart that is useful for understanding the operation of a module in FIG. 1.

Referring now to FIG. 8, there is provided a flowchart which summarizes the operation of each module 105-107, 113, 114. To avoid confusion, the process is described with respect to communications in a single direction. For example in the case of module 105, the single direction could involve data transmitted from client computer 101 to hub 108. In practice however, it is preferred that modules 105-107, 113, 114 operate bi-directionally. The process begins at step 802 when the module is powered up and continues to step 804 where module application software is initialized for executing the methods described herein. In step 806, a mission plan is loaded from a memory location within the module. At this point, the module is ready to begin processing data and proceeds to do so at step 808, where it accesses a data packet from an input data buffer of the module. In step 810, the module checks to determine if it is in a bypass mode of operation. If so, the data packet accessed in step 808 is retransmitted in step 812 without any modification of the data packet. If the module is not in bypass mode, then it must be in its active mode of operation and continues on to step 814. In step 814, the module reads the data packet to determine the identity of a source node from which the data packet originated. In step 816, it examines the packet to determine if the source node is valid. The specified source node can be compared to a list of valid nodes to determine if the specified source node is currently valid. If it is not a valid node then the packet is discarded in step 818. In step 820 the process checks to determine if a trigger event occurred. The occurrence of a trigger event will influence the selection of false identify values to use. Accordingly, in step 822, the module determines the false identify values to use based on one or more of the trigger information, clock time and mission plan. The module then continues to step 826 where it manipulates identity parameters of the data packet. Once manipulations are complete, the data packet is re-transmitted to an adjacent node from the output port of the module. In step 830, a determination is made as to whether the module has been commanded to power down. If so, the process ends at step 832. In step 808 the process continues and the next data packet is accessed from the module's input data buffer.

Figure 9:
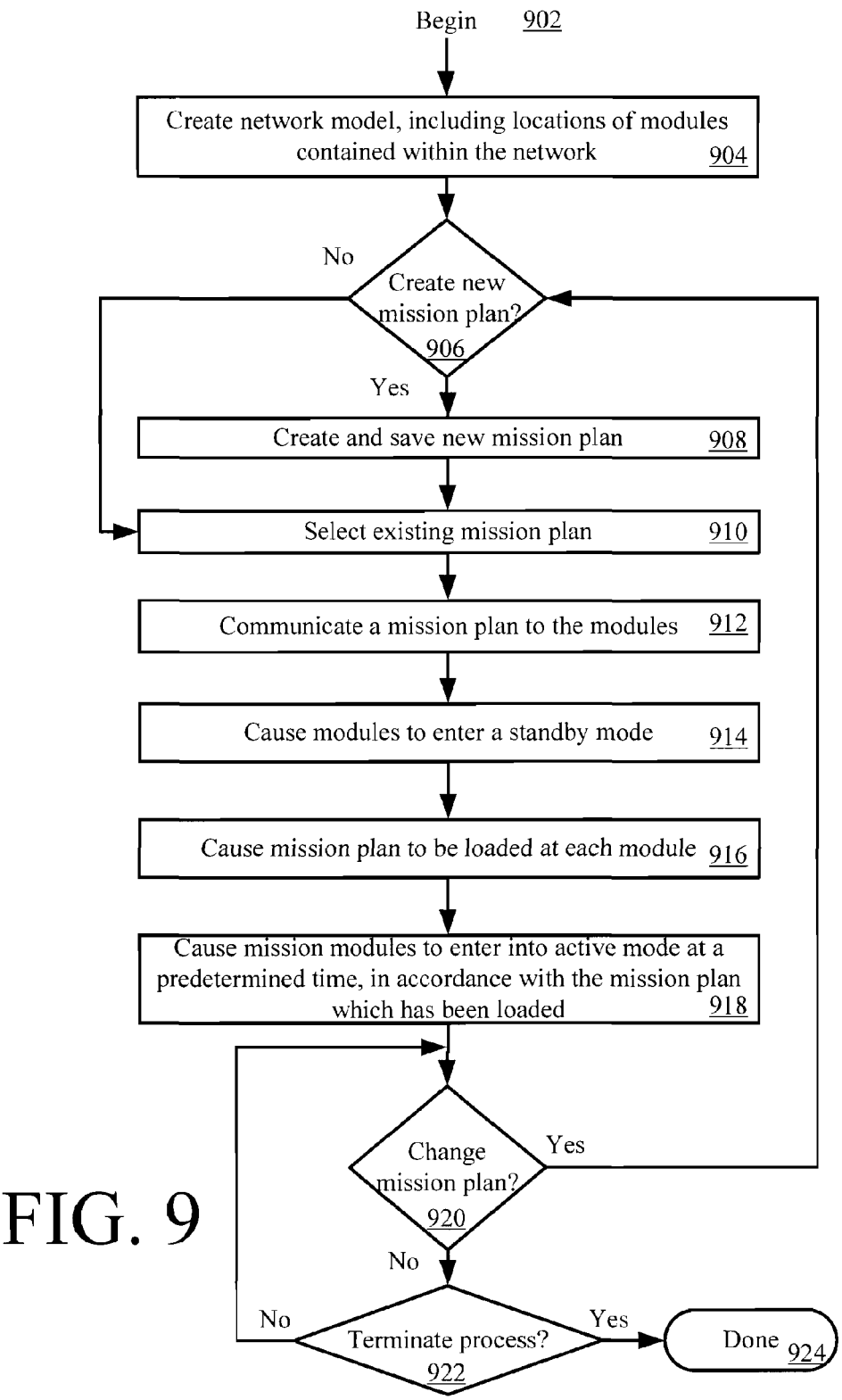
FIG. 9 is a flowchart that is useful for understanding the operation of a network control software application (NCSA) in relation to creating and loading mission plans.

Referring now to FIG. 9, there is provided a flowchart which summarizes the methods described herein for managing a dynamic computer network. The process begins in step 902 and continues to step 904, where a network model is created (e.g. as shown and described in relation to FIG. 3). In step 906, a determination is made as to whether a new mission plan is to be created. If so, a new mission plan is created in step 908 and the process continues to step 910, where the new mission plan is selected. Alternatively, if in step 906 a desired mission plan has already been created, then the method can continue directly to step 910 where an existing mission plan is selected. In step 912, the mission plan is communicated to the modules (e.g. modules 105-107, 113, 114), where the mission plan is stored in a memory location. When the network administrator is ready to implement the new mission model, a command is sent in step 914 which causes the modules to enter a standby mode as described herein. While the modules are in this standby mode, the mission plan is loaded at step 916. Loading of the mission plan occurs at each module so that the mission plan can be used to control the operations of an application software executing on the module. In particular, the mission plan is used to control the way in which the application software performs dynamic manipulations of identity parameters. In step 918, the mission modules are again caused to enter into an active operational mode in which each mission module performs manipulations of identity parameters in accordance with the mission plan. Steps 914, 916, and 918 can occur in response to specific commands sent from a network administrator, or can occur automatically at each module in response to receiving the mission plan in step 912. After step 918, the modules continue performing processing in accordance with the mission plan which has been loaded. In step 920, the process continues by checking to determine if the user has indicated a desired to change the mission plan; if so, the process returns to step 906, where the it continues as described above. If there is no indication that the user or network administrator wishes to change an existing mission plan, then the process determines in step 922 whether it has been instructed to terminate. If so, the process terminate in step 924. If no termination instruction is received, the process returns to step 920 and continues.

Figure 10:
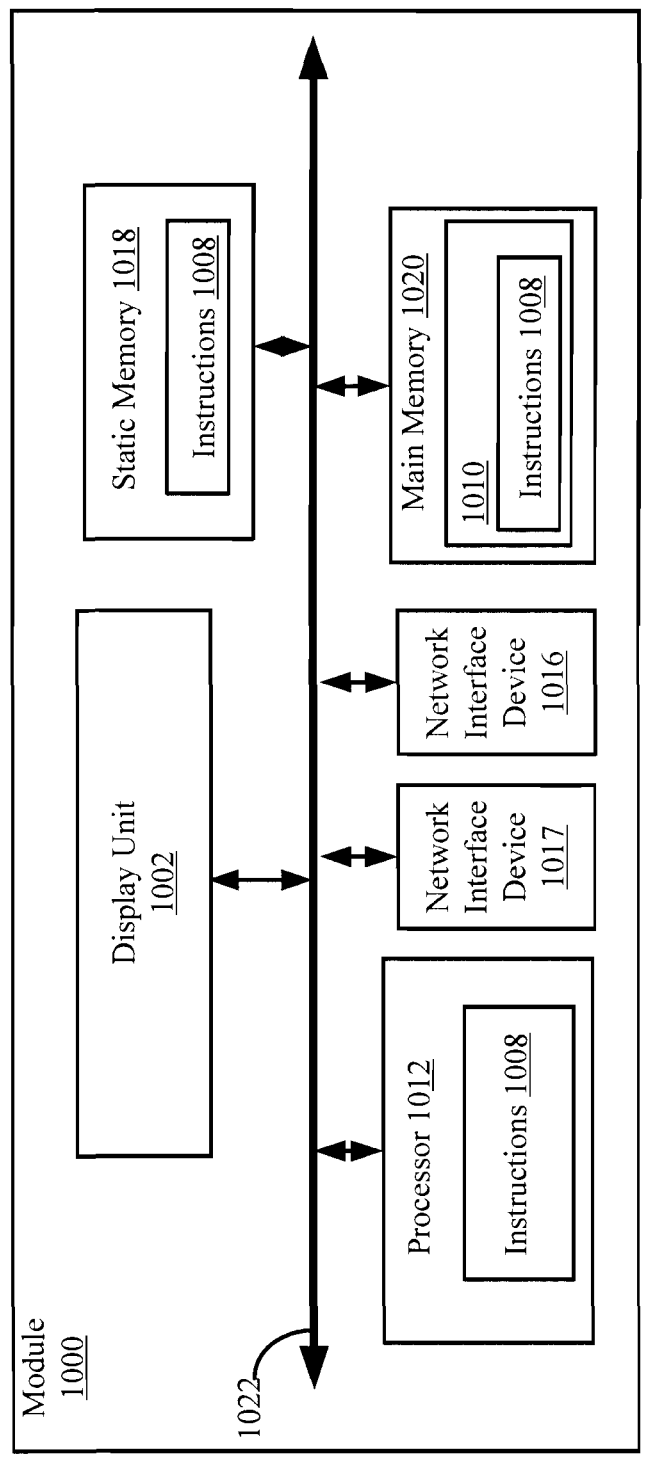
FIG. 10 is a block diagram of a computer architecture that can be used to implement the modules in FIG. 1.

Referring now to FIG. 10, there is provided a block diagram which shows a computer architecture of an exemplary module 1000 which can be used for performing the manipulation of identity parameters described herein. The module 1000 includes a processor 1012 (such as a central processing unit (CPU), a main memory 1020 and a static memory 1018, which communicate with each other via a bus 1022. The computer system 1000 can further include a display unit 1002, such as a liquid crystal display or LCD to indicate the status of the module. The module 1000 can also include one or more network interface devices 1016, 1017 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1020 includes a computer-readable storage medium 1010 on which is stored one or more sets of instructions 1008 (e.g. software code) configured to implement one or more of the methodologies, procedures, or functions described herein. The instructions 1008 can also reside, completely or at least partially, within the static memory 1018, and/or within the processor 1012 during execution thereof by the module. The static memory 1018 and the processor 1012 also can constitute machine-readable media. In the various embodiments of the present invention a network interface device 1016 connected to a network environment communicates over the network using the instructions 1008.

Figure 11:
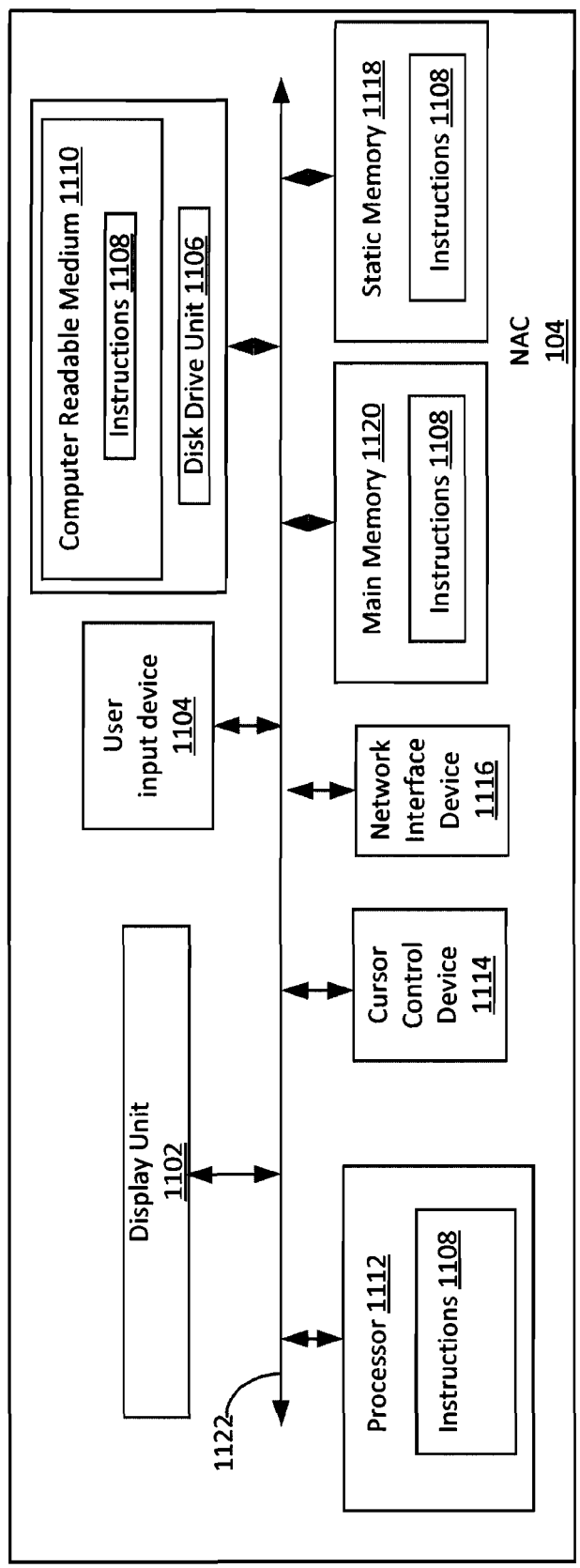
FIG. 11 is a block diagram of a computer architecture that can be used to implement the network administration computer (NAC) in FIG. 1.

Referring now to FIG. 11, there is shown an exemplary network administration computer (NAC) 114 in accordance with the inventive arrangements. The NAC can comprise various types of computing systems and devices, including a server computer, a client user computer, a personal computer (PC), a tablet PC, a laptop computer, a desktop computer, a control system or any other device capable of executing a set of instructions (sequential or otherwise) that specifies actions to be taken by that device. Further, while a single computer is illustrated in FIG. 11, the phrase "NAC" shall be understood to include any collection of computing devices that individually or jointly execute a set (or multiple sets) of instructions to perform any one or more of the methodologies discussed herein.

Referring now to FIG. 11, the NAC 104 includes a processor 1112 (such as a central processing unit (CPU), a disk drive unit 1106, a main memory 1120 and a static memory 1118, which communicate with each other via a bus 1122. The NAC 104 can further include a display unit 1102, such as a video display (e.g. a liquid crystal display or LCD), a flat panel, a solid state display, or a cathode ray tube (CRT)). The NAC 104 can include a user input device 1104 (e.g. a keyboard), a cursor control device 1114 (e.g. a mouse) and a network interface device 1116.

The disk drive unit 1106 includes a computer-readable storage medium 1110 on which is stored one or more sets of instructions 1108 (e.g. software code) configured to implement one or more of the methodologies, procedures, or functions described herein. The instructions 1108 can also reside, completely or at least partially, within the main memory 1120, the static memory 1118, and/or within the processor 1112 during execution thereof. The main memory 1120 and the processor 1112 also can constitute machine-readable media.

Those skilled in the art will appreciate that the module architecture illustrated in FIG. 10, and the NAC architecture in FIG. 11, each represent merely one possible example of a computing device that can be used respectively for performing the methods described herein. However, the invention is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1010, 1110 is shown in FIGS. 10 and 11 to be a single storage medium, the term "computer-readable storage medium" should be taken to include a single medium or multiple media (e.g. a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Noise, Decoys, and Encryption in a Dynamic Network

As discussed above, a module can be stand alone network devices or be integrated into one or more computing devices. Regardless of how they are implemented within the network, modules can intercept data packet communications, perform the necessary manipulations of identity parameters, and retransmit the data packets along a data transmission path. Another important function of modules is the proper handling of false messages (i.e. noise and decoy packets that are not valid messages) that are transmitted throughout a Moving Target Technology (MTT) network.

For the purposes of the following discussion, the following definitions apply. A "data message is a message comprising one or more data packets that is used to transport information through a computer network. A "valid message" is a data message that contains real data, i.e. normal network traffic between source and destination nodes. A "well formed message" is a message that contains all the information necessary to be recognized as a valid message. By definition, valid messages are well-formed messages. A "false message" is a data message that does not contain real data, but is generated and transmitted through the network as though it was a valid message. False messages can include noise messages/packets and decoy messages/packets.

A "noise packet" is a false message data packet that includes random data and does not transport usable information. A "decoy packet" is a well formed false message data packet that includes ostensibly valid data and appears to transport valid and usable information, but does not include valid identity parameters. A "valid packet" is a valid message data packet that includes valid data and does transport usable information, i.e. includes valid identity parameters. Finally an "encrypted packet" is any of the packets described above that has been encrypted through the application of an encryption algorithm such that the data cannot be recovered without access to an encryption key. All of the above packet types are controlled and defined in accordance with a currently active mission plan.

An "invalid message" is a data message that is neither a valid message nor a false message. Invalid messages can be corrupted messages, attack messages, or any other type of message that are not recognized by the network. An "invalid packet" is an invalid message data packet that includes unrecognized data that is corrupted, malicious, and/or otherwise invalid.

As discussed above, mission plans are loaded into the modules and control the behavior of modules including the manipulation of identity parameters. Referring once again to FIG. 1, modules 105, 106, 107, 113, and 114 along with client computers 101, 102, 103, servers 111, 112, hubs 108, 109, bridge 115, and router 110 form network 100 and operate in accordance with at least one mission plan. The mission plan also defines decoy and noise packets that can be formed by modules or any MTT-enabled device within the dynamic network. These packets provide an additional level of security by obscuring the flow of valid packets through the network.

In an exemplary embodiment, decoy and noise packets are generated by the same device that pseudorandomly modifies the identity parameters of valid packets sent through the MTT network. Each decoy and/or noise packet is subject to a distance vector that defines a "life span" of the packet. Further, decoy and/or noise packets can also be pseudorandomly modified to the same extent as valid messages. All of these features are specified in the mission plan. For example, module 105, operating in accordance with a mission plan, can generate a decoy packet with a distance vector sufficient to allow the packet to travel through three network nodes before being filtered out of the network. In this example, a message similar to message 122 of FIG. 1 is generated and sent through the network with client computer 102 as its destination. The message travels through network nodes 108, 110, and 109 before reaching module 106. At module 106 the packet is analyzed in accordance with the currently active mission plan and is found to have exhausted its distance vector. This can be implemented in the form of filtering rules, active only at module 106, that define the behavior of module 106 with respect to each message received. Since false messages are generated according to the mission plan, the module 106 can include a set of filtering rules that inform module 106 to either forward or drop the false messages. Returning to the exemplary embodiment, when the decoy packet is received at module 106 (which can be stand alone or embedded within client computer 102) the message is identified as a decoy message with an exhausted distance vector and is dropped. Notably, this occurs before the message reaches client computer 102 because, although it is well-formed, the decoy packet does not include valid data.

In the exemplary embodiment described above, noise packets are processed in a similar way, except that they are not well-formed. Optionally any message, including decoy and noise messages, or any portion of the message, can be encrypted using any encryption technique such that they are indistinguishable from noise without the proper encryption key. Therefore, the network administrator can implement the MTT network's noise, decoy, and encryption capabilities in a number of combinations to render the valid messages indistinguishable from noise and/or decoys. As a result, it is very difficult for an attacker attempting to eavesdrop on the MTT network to filter out the valid messages from the noise and/or decoy messages.

Figure 12:
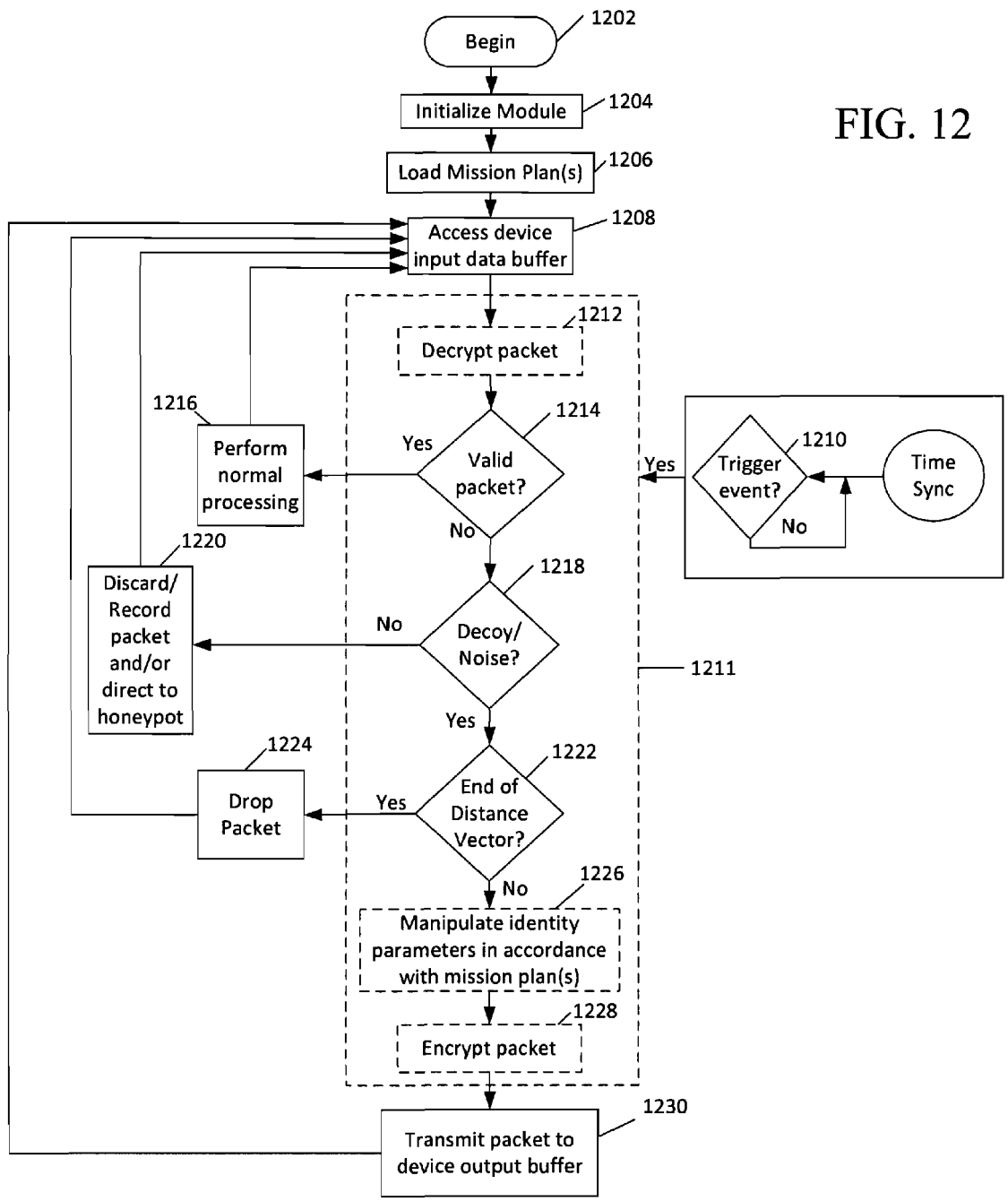
FIG. 12 is a flowchart that is useful for understanding the operation of a network device that processes noise and decoy messages.

Referring now to FIG. 12, a flowchart is provided describing a process for analyzing noise and decoy packets in accordance with a mission plan. The process begins at step 1202 when the device is powered up and continues to step 1204 where module is initialized for executing the methods described herein. In step 1206, one or more mission plans are loaded from a memory location within the device. A mission plan can define a dynamic maneuvering of one or more logical networks within a single dynamic computer network. One or more mission plans can be loaded in a device in a manner as described above in reference to modules.

For example a mission plan can define a dynamic maneuvering of an MTT enabled network. In the exemplary embodiments described herein, the MTT enabled network includes a source node from which a packet has originated and a destination node to which the packet has been sent. In a preferred embodiment, one or more mission plans are loaded into the memory associated with the device and are activated. The state of each mission plan will generally be determined based on one or more trigger events. The trigger event is any predetermined type of stimulus which causes an operation of the mission plan to dynamically change the way that identity parameters are being manipulated in the network. As such, the occurrence of a trigger event effectively results in an MTT device (e.g., a module, switch, router, firewall, and the like) that is able to distinguish between traffic received before the trigger event, which is processed using previously active mission plan, and traffic received after the trigger event, which is processed using the newly activated mission plan. As noted above, the trigger event can result from a variety of different conditions and input stimuli applied to the network. In some embodiments, the mission plans stored for use by the device may be loaded into memory when the device is not active, or during a time when the MTT operations of the network are disabled, e.g. when the device is in a by-pass state.

Once the mission plans have been loaded, the device is ready to begin processing data and proceeds to do so at step 1208, where a data packet is accessed from an input data buffer of the device. The input data buffer will contain data packets received at the device from a source node. For example, the packets can be received at a module embedded with a firewall via the internet. One of skill in the art will recognize that a module can also include the functionality of a bridge, router, and/or firewall. Alternatively, a bridge, router, or firewall can also include module functionality. The embodiments of the present invention are not limited in this regard.

In step 1210, the device checks to determine if a trigger event has occurred that would change the MTT status. This step of checking for the occurrence of a trigger event can be performed periodically as shown based on a clock signal, or it can be performed at any time during the process included within box 1211. This is an important step because the occurrence of a trigger event can have a significant effect upon the calculation of proper false identify parameter values that are currently in use in the MTT network, including those used to identify noise and decoy packets. The information from step 1210, and any other appropriate information concerning the MTT status of the MTT network, is then used to update the current status of any MTT manipulations that are in use by the MTT network at that time, and to aid in identification of valid, noise, and decoy packets.

In step 1212, the device can optionally decrypt the packet. Encryption and decryption techniques are well known in the art and any method of encryption/decryption can be used without limitation. The details of which packets are encrypted are defined by the mission plan. The process continues in step 1214, the device determines whether the received, unencrypted data packet is a valid data packet. The device makes this determination by comparing the identity parameters of the received data packet against those expected for a valid data packet arriving at the device. If the identity parameters are valid for the current mission plan and epoch (1214: Yes), the valid packet is processed in accordance with the current device's normal functionality. For example, at step 1216 the valid packet can be processed by a module device described above in relation to FIG. 8. Alternatively, the valid packet may be processed by an MTT enabled router, bridge, switch, hub, firewall, server, client computer or any other MTT network device in accordance with the operational process of the particular device.

If the packet is not a valid packet (1214: No), the process continues on to step 1218. In step 1218, the device determines whether the data packet is a noise packet or a decoy packet. Again, the module makes this determination by comparing the identity parameter values in the data packet with those that are expected by the mission plan. This step can be performed in a variety of different ways. As described above, a mission plan can define the parameter values (including false identity parameter values) which are currently in use by the MTT network. These parameter values not only include those used by valid packets, but also those used by noise and decoy packets. In some embodiments, the comparison in step 1218 can be accomplished by accessing a mission plan associated with the MTT network, and performing pseudorandom processing to calculate a complete set of all false identity parameter values currently in use within the source network, including those used for decoy and noise packets. In other embodiments, a set of filtering rules can be applied to the packets. In these embodiments, the filtering rules defined by the mission plan will allow the device to differentiate noise and decoy packets from invalid, corrupted, or malicious packets.

Alternatively, step 1218 can involve a more limited determination which involves only calculating a partial set of false identity parameter values. For example, such partial set could be limited to a selected group of identity parameters. Use of such partial sets can limit the ability of the device to evaluate all of the identity parameter values contained in a packet. However, calculation of a partial set of false identity parameters requires less intensive processing and could be advantageous in certain scenarios, particularly when identity parameter values are being changed at a rapid rate.

If the packet is not a decoy or a noise packet (1218: No), the process continues to step 1220, where the packet is discarded. Step 1220 can be implemented in a variety of ways to accommodate the security preferences of the network administrator. In one embodiment, the packet can simply be dropped with no additional processing or analysis. Alternatively, the packet may be directed to a honeypot where corrupted and/or malicious packets can be analyzed for network security and evidence gathering purposes. In another embodiment, the information in the packet may be recorded for logging and non-repudiation purposes. One of skill in the art will recognize that the above procedures can be applied in any combination. Additionally, the mission plan may identify one or more of the above described procedures If the packet is a decoy or a noise packet (1218: Yes), the process continues to step 1222. In step 1222, the distance vector of the decoy/noise packet is determined. As discussed above, the distance vector is the distance between a first and a second location in a communications path, typically expressed as a number of nodes. With respect to decoy and noise packets, a distance vector is the number of hops the packets will travel before they are dropped by the network, in accordance with the mission plan. In an exemplary embodiment, the distance vector is determined by analyzing the current identity parameters of the packet in reference to the current mission plan. The network device includes a base identity that is used to determine a set of rules, defined in the mission plan, to be applied to any false messages that are generated. If the mission plan specifies that the distance vector ends at the device (1222: Yes), the device drops the packet. On the other hand, if the distance vector does not end at the device (1222: No), the process continues.

In addition to performing the functions described herein, the device can be configured to perform dynamic manipulations of identity parameters in a manner similar to that described above, with respect to modules. Referring again to FIG. 12, optional step 1226 can comprise dynamic manipulation of identity parameters in accordance with a mission plan and a current network status of the destination MTT network. The operations at step 1226 would be similar to identity parameter manipulations performed by modules 105-107, 113, 114 as described above. The device can modify the group of identity parameters for which false values are to be assigned. The device can also manipulate one or more false identity parameter values to specify false values that are different from those assigned by the source MTT network. In a preferred embodiment, the set of false identity parameters and the actual false values would be determined in accordance with a mission plan for the destination MTT network. Notably, the manipulation operations in step 1226 can be selectively toggled on and off in accordance with a mission plan.

As noted above, any message or data stream traveling through the network can be encrypted and received encrypted packets are decrypted prior to processing. Therefore, at optional step 1228, the packet can be encrypted prior to being transmitted to the next hop in the communications path. Finally, the process concludes at step 1230 where the packet is sent to the output buffer of the device and transmitted to the next hop in the communication path. The process then returns to step 1208 to access the next packet from the input buffer of the device.

Types of Identity Parameters that can be Varied

Referring now to FIG. 13, there is provided a list of some of the identity parameters that can be manipulated by the modules 105-107, 113, 114, bridge 115 and/or by router 110. Each of the parameters listed in FIG. 13 is included in a data communication included in a network using a TCP/IP communication protocol. Most of the information types listed in FIG. 13 are well known to those skilled in the art. However, a brief description of each type of information and its use as an identity parameter is provided herein. Also provided is a brief discussion of the ways in which each identity parameter can be manipulated.

IP Address. An IP Address is a numerical identifier assigned to each computing device participating in a computer network where the network uses the well known Internet Protocol for communication. The IP address can be a 32 bit or 128 bit number. For purposes of the present invention, the IP address number can be changed to a false value that is selected randomly (e.g. using a pseudorandom number generator). Alternatively, the false IP address value can be randomly selected from a predetermined list of false values (e.g.

a list specified by a mission plan). The source and destination IP addresses are included in header portion of a data packet. Accordingly, manipulation of these values is performed by simply changing by using packet manipulation techniques which change the IP header information. When the packet arrives at a second module (the location of which can be manipulated), the false IP address values are transformed back to their true values. The second module uses the same pseudorandom process (or its inverse) to derive the true IP address value based on the false value.

MAC Address. A MAC address is a unique value assigned to a network interface device by a manufacturer and stored in an onboard ROM. For purposes of the present invention, the source and/or destination MAC address can be changed to a false value that is selected randomly (e.g. using a pseudorandom number generator). Alternatively, the false MAC value can be randomly selected from a predetermined list of false values (e.g. a list specified by a mission plan). The source and destination MAC addresses are included in header portion of data packet. Accordingly, manipulation of these values is performed by simply changing an Ethernet header information of each packet. When the packet arrives at a second module (the location of which can be manipulated), the false MAC address values are transformed back to their true values. A module receiving a packet will use the same pseudorandom process (or its inverse) to derive the true MAC address value based on the false value.

Network/Subnet. In some embodiments, the IP address can be thought of as a single identity parameter. However, an IP address is generally defined as including at least two parts which include a network prefix portion and a host number portion. The network prefix portion identifies a network to which a data packet is to be communicated. The host number identifies the particular node within a Local Area Network (LAN). A sub-network (sometimes referred to as a subnet) is a logical portion of an IP network. Where a network is divided into two or more sub-networks, a portion of the host number section of the IP address is used to specify a subnet number. For purposes of the present invention, the network prefix, the subnet number and the host number can each be considered to be a separate identity parameter. Accordingly, each of these identity parameters can be separately manipulated independently of the others in a pseudorandom way. Moreover, it will be appreciated that a data packet will include a source IP address and a destination IP address. Accordingly, the network prefix, the subnet number and host number can be manipulated in the source IP address and/or the destination IP address, for a total of six different variable identity parameters that can be manipulated in a pseudorandom way. A module receiving a packet will use the same pseudorandom process as an originating node (or the inverse of such process) to derive the true Network/subnet information value based on the false value.

TCP Sequence. Two client computers communicating with each other on opposite sides of a TCP session will each maintain a TCP sequence number. The sequence number allows each computer to track how much data it has communicated. The TCP sequence number is included in the TCP header portion of each packet which is communicated during the session. At the initiation of a TCP session, the initial sequence number value is randomly selected. For purposes of the present invention, the TCP sequence number can be manipulated as an identity parameter in accordance with a pseudorandom process. For example, the TCP sequence number can be changed to a false value that is selected randomly (e.g. using a pseudorandom number generator). When the packet is received at a different module of the network (the location of which will be dynamically varied), the TCP sequence number can be transformed from a false value back to a true value, using an inverse of the pseudorandom process.

Port Number. A TCP/IP port number is included in the TCP or UDP header portion of a data packet. Ports as used in the TCP/IP communication protocol are well known in the art and therefore will not be described herein in detail. The port information is contained within the TCP header portion of the data packet. Accordingly, manipulation of the port information is accomplished by simply modifying the TCP header information to change a true port value to a false port value. As with the other identity parameters discussed here, the port number information can be manipulated or transformed to a false value in accordance with a pseudorandom process at a first module. The port information can later be transformed from a false value to a true value at a second module, using an inverse of the pseudorandom process.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for processing data messages in a network device connected to a dynamic computer network, the method comprising:
  implementing a mission plan specifying a set of filtering rules to be applied to messages received at each of the plurality of network devices based on a message type and a message distance vector;
  determining a message type of a received data message generated in accordance with the mission plan from among a plurality of different message types based on at least one identity parameter value included in the received data message and useful for identifying a network node;
  on a condition that the message type is a false message, determining whether the message distance vector of the false message has been exhausted;
  on a condition that the distance vector of the false message has been exhausted, dropping the received data message; and
  on a condition that the distance vector of the false message has not been exhausted, transmitting the received data message in accordance with the mission plan.

2. The method according to claim 1, wherein the false message is one of a noise message or a decoy message.

3. The method according to claim 1, further comprising:
  on a condition that the message type is an invalid message, performing at least one of discarding the data message, recording the data message, and directing the data message to a honeypot.

4. The method according to claim 1, further comprising:
  on a condition that the message type is a valid message, processing the message in accordance with a native function of the network device.

5. The method according to claim 1, wherein determining the message type further comprises comparing the identity parameter value included in the received message to a set of expected identity parameter values generated by the mission plan.

6. The method according to claim 1, wherein determining whether the message distance vector of the false message has been exhausted further comprises comparing the identity parameter values included in the received message to a set of filtering rules generated by the mission plan.

7. The method according to claim 1, further comprising pseudorandomly modifying values for a set of identity parameters of the received data message to transform the set to specify false information before transmitting the data message.

8. The method according to claim 7, wherein the set is determined in response to a trigger event.

9. The method according to claim 8, further comprising determining the occurrence of said trigger event based on at least one of a user command, a timing interval, and a detection of a potential network security threat.

10. The method according to claim 1, further comprising decrypting the received data message after the receiving step.

11. The method according to claim 8, further comprising encrypting the received data message before the transmitting step.

12. A network device for processing data messages in a first network, the device comprising:
    a plurality of ports configured to receive and transmit data messages that each include a plurality of identity parameters;
    a memory configured to store a mission plan that specifies a message type, a message generation location, and a message distance vector for false messages; and
    at least one processing unit configured to:
    generate a false message based on the mission plan;
    determine a message type of a received data message generated in accordance with the mission plan from a plurality of different message types based on at least one identity parameter value included in the received data message and useful for identifying a network node;
    on a condition that the message type is a false message, determining whether the message distance vector of the false message has been exhausted;
    on a condition that the message distance vector of the false message has been exhausted, drop the received data message; and
    on a condition that the message distance vector of the data message has not been exhausted, transmit the received data message in accordance with the mission plan.

13. The device of claim 12, wherein the false message is one of a noise message or a decoy message.

14. The device of claim 12, wherein the processing unit is further configured to:
    on a condition that the message type is an invalid message, perform at least one of discarding the data message, recording the data message, and directing the data message to a honeypot; and
    on a condition that the message type is a valid message, process the message in accordance with a native function of the network device.

15. The device of claim 12, wherein the processing unit is further configured to pseudorandomly modify a set of identity parameters of the received data message to transform the set to specify false information before transmitting the data message.

16. The device of claim 12, wherein the device is a module.

17. The device of claim 16, wherein the module is embedded within one of a hub, a switch, a router, a bridge, a firewall, a personal computer, and a server.

18. The device of claim 12, wherein the processing unit is further configured to encrypt and decrypt data messages.

19. A method for filtering false messages in a dynamic computer network, the method comprising:
    implementing a mission plan on a plurality of network devices, the mission plan specifying a set of filtering rules to be applied to messages received at each of the plurality of network devices based on a message type and a message distance vector;
    generating a false message at a first network device that includes a plurality of identity parameters;
    filtering the false message at second network device based on the set of filtering rules for the second device;
    wherein one of the filtering rules requires a determination as to a message type of the false message based on at least one identity parameter included in the false message and useful for identifying a network node.

20. The method according to claim 19, wherein filtering the false message includes:
    on a condition that the false message has reached the end of the distance vector, dropping the false message at the second network device; and
    on a condition that the false message has not reached the end of the distance vector, transmitting the false message to a third network device in accordance with the mission plan.

* * * * *